(12) United States Patent
Fulker et al.

(10) Patent No.: US 11,465,453 B2
(45) Date of Patent: Oct. 11, 2022

(54) COMPUTER SYSTEM WITH TIRE WEAR MEASUREMENT MECHANISM AND METHOD OF OPERATION THEREOF

(71) Applicant: MOJ.IO, Inc., Vancouver (CA)

(72) Inventors: James Fulker, Palo Alto, CA (US); David Stelzer, Redwood City, CA (US); Nicholas Butler, Campbell, CA (US); Anthony Hall, San Jose, CA (US)

(73) Assignee: MOJ.IO, Inc., Vancouver (CA)

( * ) Notice: Subject to any disclaimer, the term of this patent is extended or adjusted under 35 U.S.C. 154(b) by 220 days.

(21) Appl. No.: 16/798,119

(22) Filed: Feb. 21, 2020

(65) Prior Publication Data
US 2021/0260932 A1    Aug. 26, 2021

(51) Int. Cl.
*G06K 9/00*    (2022.01)
*B60C 11/24*    (2006.01)
*G06T 7/00*    (2017.01)

(52) U.S. Cl.
CPC ............ *B60C 11/246* (2013.01); *G06T 7/001* (2013.01); *G06T 2207/30108* (2013.01)

(58) Field of Classification Search
CPC ... B60C 11/246; B60C 25/007; B60C 99/006; G06T 7/001; G06T 2207/30108; G01B 5/0025; G01B 11/22
See application file for complete search history.

(56) References Cited

U.S. PATENT DOCUMENTS

| | | | |
|---|---|---|---|
| 8,542,881 B2 | 9/2013 | Teti et al. | |
| 9,355,346 B2 | 5/2016 | Butz | |
| 9,805,697 B1 | 10/2017 | Dorrance et al. | |
| 10,102,616 B2 | 10/2018 | Miller et al. | |
| 10,179,487 B1 | 1/2019 | Larson et al. | |
| 10,295,333 B2 | 5/2019 | Fish et al. | |
| 10,773,557 B1* | 9/2020 | Mast | G01B 11/08 |
| 2007/0018803 A1* | 1/2007 | Lang | G01L 17/005 |
| | | | 340/442 |
| 2012/0020526 A1 | 1/2012 | Teti et al. | |
| 2014/0240349 A1 | 8/2014 | Tuukkanen | |
| 2015/0075271 A1* | 3/2015 | Tracy | G01M 17/02 |
| | | | 73/146 |
| 2015/0269468 A1 | 9/2015 | Butz | |
| 2016/0221404 A1* | 8/2016 | Lee | B60C 11/246 |
| 2016/0224863 A1* | 8/2016 | Lee | G06K 9/2081 |
| 2016/0343126 A1 | 11/2016 | Miller et al. | |

(Continued)

FOREIGN PATENT DOCUMENTS

DE    19515949 A1    11/1996
KR    20180039322 A    4/2018
(Continued)

*Primary Examiner* — Samir A Ahmed
(74) *Attorney, Agent, or Firm* — Perspectives Law Group, Corp.

(57) ABSTRACT

A method of operation of a computer system comprising: receiving a tire image for a target tire; determining an analyzability for the target tire based on a wear model including the tire image; analyzing a wear level for the target tire based on the analyzability meets or exceeds a usable threshold; generating an augmented reality image for the wear level for the target tire; and communicating the augmented reality image for displaying the wear level for the target tire.

20 Claims, 9 Drawing Sheets

(56) References Cited

U.S. PATENT DOCUMENTS

| | | | |
|---|---|---|---|
| 2017/0052021 A1* | 2/2017 | Rhoades | H04N 5/23245 |
| 2017/0190223 A1 | 7/2017 | Fish et al. | |
| 2019/0139335 A1 | 5/2019 | Morawitz et al. | |
| 2020/0149997 A1* | 5/2020 | Demirel | G06T 7/70 |
| 2020/0334922 A1* | 10/2020 | Johnston | G07C 5/008 |
| 2021/0197625 A1* | 7/2021 | Laperle | G01M 17/02 |

FOREIGN PATENT DOCUMENTS

| | | |
|---|---|---|
| KR | 20180085574 A | 7/2018 |
| KR | 20190129202 A | 11/2019 |
| WO | 2020041899 A1 | 3/2020 |

\* cited by examiner

COMPUTER SYSTEM WITH TIRE WEAR MEASUREMENT MECHANISM AND METHOD OF OPERATION THEREOF

TECHNICAL FIELD

An embodiment of the present invention relates generally to a computer system, and more particularly to a system with a tire wear measurement mechanism.

BACKGROUND ART

Modern computer systems, especially devices such as a vehicle, a telematics system in a vehicle, a computing device, a cellular phone, a tablet computer, a smart phone, a notebook computer, vehicle embedded computer system, a wearable device, internet of things (IoT) device, a security camera, a dash cam, and computing device, are providing increasing levels of functionality to support modem life including additional analytical services. Research and development in the existing technologies can take a myriad of different directions.

As users become more empowered with the growth of computer system, new and old paradigms begin to take advantage of this new space. One such space is increased analytical functions for devices for the measurement of tire wear.

Thus, a need still remains for a computer system with tire wear measurement mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a method of operation of a computer system including: receiving a tire image for a target tire; determining an analyzability for the target tire based on a wear model including the tire image; analyzing a wear level for the target tire based on the analyzability meets or exceeds a usable threshold; generating an augmented reality image for the wear level for the target tire; and communicating the augmented reality image for displaying the wear level for the target tire.

An embodiment of the present invention provides a computer system, including: a communication unit configured to: receive a tire image for a target tire; a control unit, coupled to the communication unit, configured to: determine an analyzability for the target tire based on a wear model including the tire image; analyze a wear level for the target tire based on the analyzability meets or exceeds a usable threshold; generate an augmented reality image for the wear level for the target tire; and communicate the augmented reality image for displaying the wear level for the target tire.

An embodiment of the present invention provides a non-transitory computer readable medium including instructions executable by a control circuit for a computer system, including: receiving a tire image for a target tire; determining an analyzability for the target tire based on a wear model including the tire image; analyzing a wear level for the target tire based on the analyzability meets or exceeds a usable threshold; generating an augmented reality image for the wear level for the target tire; and communicating the augmented reality image for displaying the wear level for the target tire.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
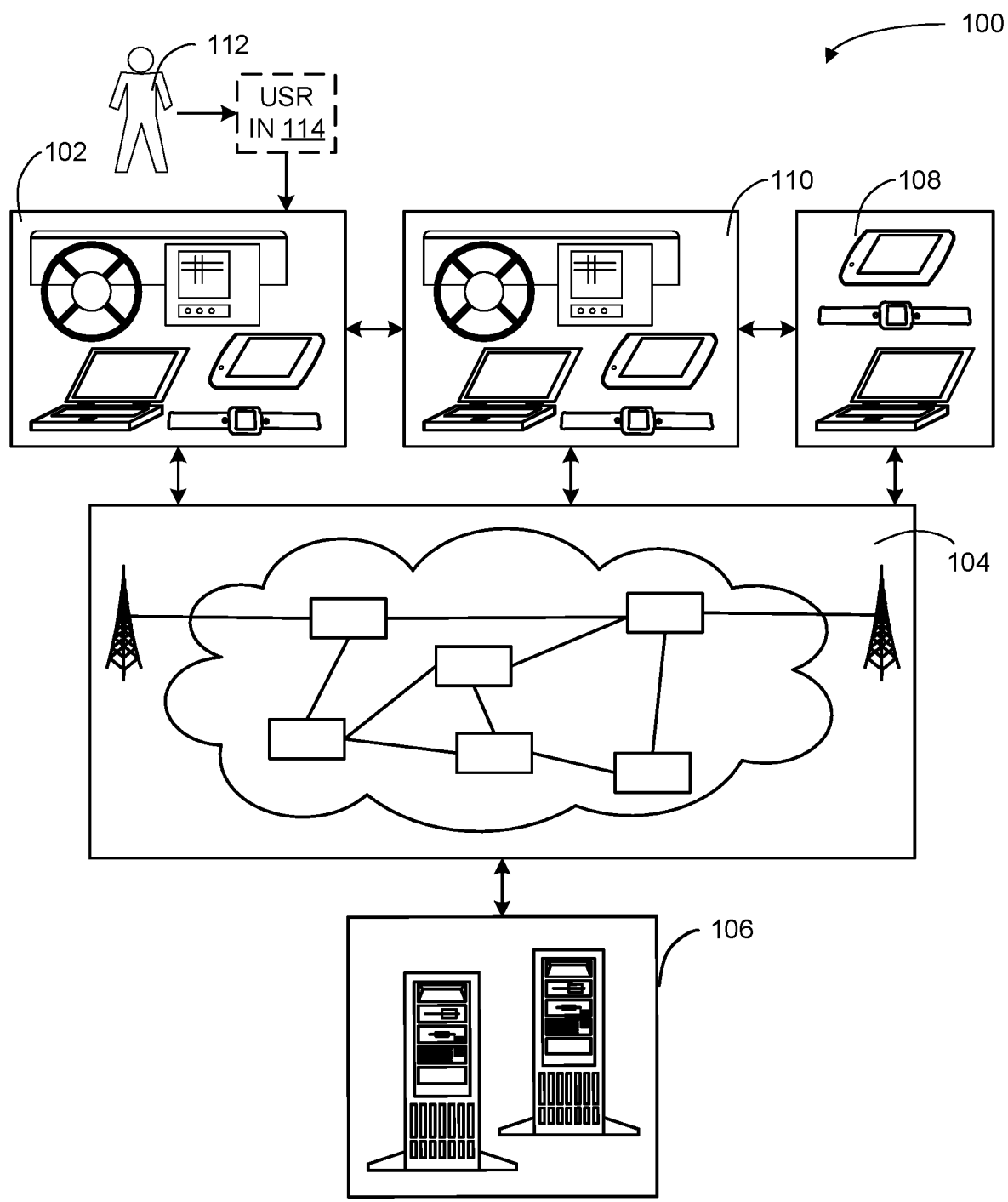
FIG. 1 is a computer system with a tire wear measurement mechanism in an embodiment of the present invention.

Embodiments provide a computer system that can measure tire wear. Images, videos, or a combination thereof can be used to measure the wear of a tire. The correct measurement of the tire wear provides for the determination of the health of the tire. The information gathered can also be used to minimize the risk of accidents caused by tire blowouts, poor health of tire tread, unsafe conditions, or a combination thereof.

Embodiments provide the computer system to improve the reliability of tire wear measurement by generating a composite image of a tire providing additional information for analysis. The computer system can analyze the composite image of the target tire to determine the wear of the target tire.

Embodiments provide the simplified and robust determination of the tire wear allowing for the computer system to provide accurate measurements. As an example, the computer system can help determine the health of the tire, the wear of the tire, potential debris that cause safety hazards, the depth of the tire treads, or a combination thereof.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part.

Generally, the invention can be operated in any orientation. The embodiments have been numbered first embodiment, second embodiment, etc. as a matter of descriptive convenience and are not intended to have any other significance or provide limitations for an embodiment of the present invention. The terms first, second, etc. can be used throughout as part of element names and are used as a matter of descriptive convenience and are not intended to have any other significance or provide limitations for an embodiment.

The term "module" referred to herein can include or be implemented as software, hardware, or a combination thereof in the present invention in accordance with the context in which the term is used. For example, the software can be machine code, firmware, embedded code, and application software. The software can also include a function, a call to a function, a code block, or a combination thereof. Also for example, the hardware can be gates, circuitry, processor, computer, integrated circuit, integrated circuit cores, a pressure sensor, an inertial sensor, a microelectromechanical system (MEMS), passive devices, physical non-transitory memory medium including instructions for performing the software function, a portion therein, or a combination thereof to control one or more of the hardware units or circuits. Further, if a module is written in the apparatus claims section below, the modules are deemed to include hardware circuitry for the purposes and the scope of apparatus claims.

The modules in the following description of the embodiments can be coupled to one other as described or as shown. The coupling can be direct or indirect without or with, respectively, intervening items between coupled items. The coupling can be physical contact or by communication between items.

Referring now to FIG. 1, therein is shown a computer system 100 with a tire tread measurement mechanism in an embodiment of the present invention. The computer system 100 includes a first device 102, such as a client or a server, connected to a second device 106, such as a client or server. The first device 102 can communicate with the second device 106 with a communication path 104, such as a wireless or wired network.

For example, the first device 102 can be of any of a variety of devices, such as a vehicle, a telematics system in a vehicle, a computing device, a cellular phone, a tablet computer, a smart phone, a notebook computer, vehicle embedded computer system, a wearable device, internet of things (IoT) device, a security camera, or computing device. The first device 102 can couple, either directly or indirectly, to the communication path 104 to communicate with the second device 106 or can be a stand-alone device.

The second device 106 can be any of a variety of centralized or decentralized computing devices, photo devices, or video devices. For example, the second device 106 can be a multimedia computer, a laptop computer, a desktop computer, grid-computing resources, a virtualized computer resource, cloud computing resource, routers, switches, peer-to-peer distributed computing devices, or a combination thereof.

The second device 106 can be centralized in a single room or within a vehicle, distributed across different rooms, distributed across different geographical locations, embedded within a telecommunications network. The second device 106 can couple with the communication path 104 to communicate with the first device 102. The second device 106 can also be a client type device as described for the first device 102.

For illustrative purposes, the computer system 100 is described with the second device 106 as a computing device, although it is understood that the second device 106 can be different types of devices, such as a standalone sensor or measurement device. Also for illustrative purposes, the computer system 100 is shown with the second device 106 and the first device 102 as end points of the communication path 104, although it is understood that the computer system 100 can have a different partition between the first device 102, the second device 106, and the communication path 104. For example, the first device 102, the second device 106, or a combination thereof can also function as part of the communication path 104.

The communication path 104 can span and represent a variety of networks and network topologies. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

The computer system 100 can further include a third device 108, a fourth device 110, or a combination thereof. The third device 108, the fourth device 110, or a combination thereof can be similar to the first device 102, the second device 106, or a combination thereof.

For example, the third device 108, the fourth device 110, or a combination thereof can include an end-user device, a mobile device, a server, a base station, a maneuverable vehicle or object, a portion thereof, or a combination thereof. Also for example, the third device 108, the fourth device 110, or a combination thereof can include device or subsystem included in or integral with a vehicle, such as a computing system, an infotainment system, or a combination thereof.

As a more specific example, the third device 108, the fourth device 110, or a combination thereof can include a smart phone, personal digital assistance, a notebook computer, a wearable device, internet of things (IoT) device, automotive telematics navigation system, or other multi-functional mobile communication or entertainment device. Also as a more specific example, the third device 108, the fourth device 110, or a combination thereof can include a computer, grid computing resources, a virtualized computer resource, cloud computing resource, routers, switches, peer-to-peer distributed computing devices, or a combination thereof.

The computer system 100 can be used by a user 112. The user 112 can include a person or an entity accessing or utilizing the computer system 100 or a device therein. For example, the user 112 can include a person owning or operating the first device 102, the third device 108, the fourth device 110, a service, or a combination thereof. Also for example, the user 112 can access or utilize the second device 106 through the first device 102, the third device 108, the fourth device 110, a service, or a combination thereof.

The computer system 100 can further process a direct user input 114 from the user 112. The direct user input 114 can include an input or a stimulus directly from or provided by the user 112. The direct user input 114 can be provided by or from the user 112 directly to or directly on the first device 102, the third device 108, the fourth device 110, or a combination thereof. The direct user input 114 can include the input or the stimulus directly for or related to a corresponding software, application, feature, or a combination thereof.

The computer system 100 can implement one or more embodiments, an inventive feature or embodiment, a portion therein, or a combination thereof without the direct user input 114. The computer system 100 can further implement one or more embodiments, an inventive feature or embodiment, a portion therein, or a combination thereof using the direct user input 114 unrelated thereto, previous instances of the direct user input 114, or a combination thereof.

Figure 2:
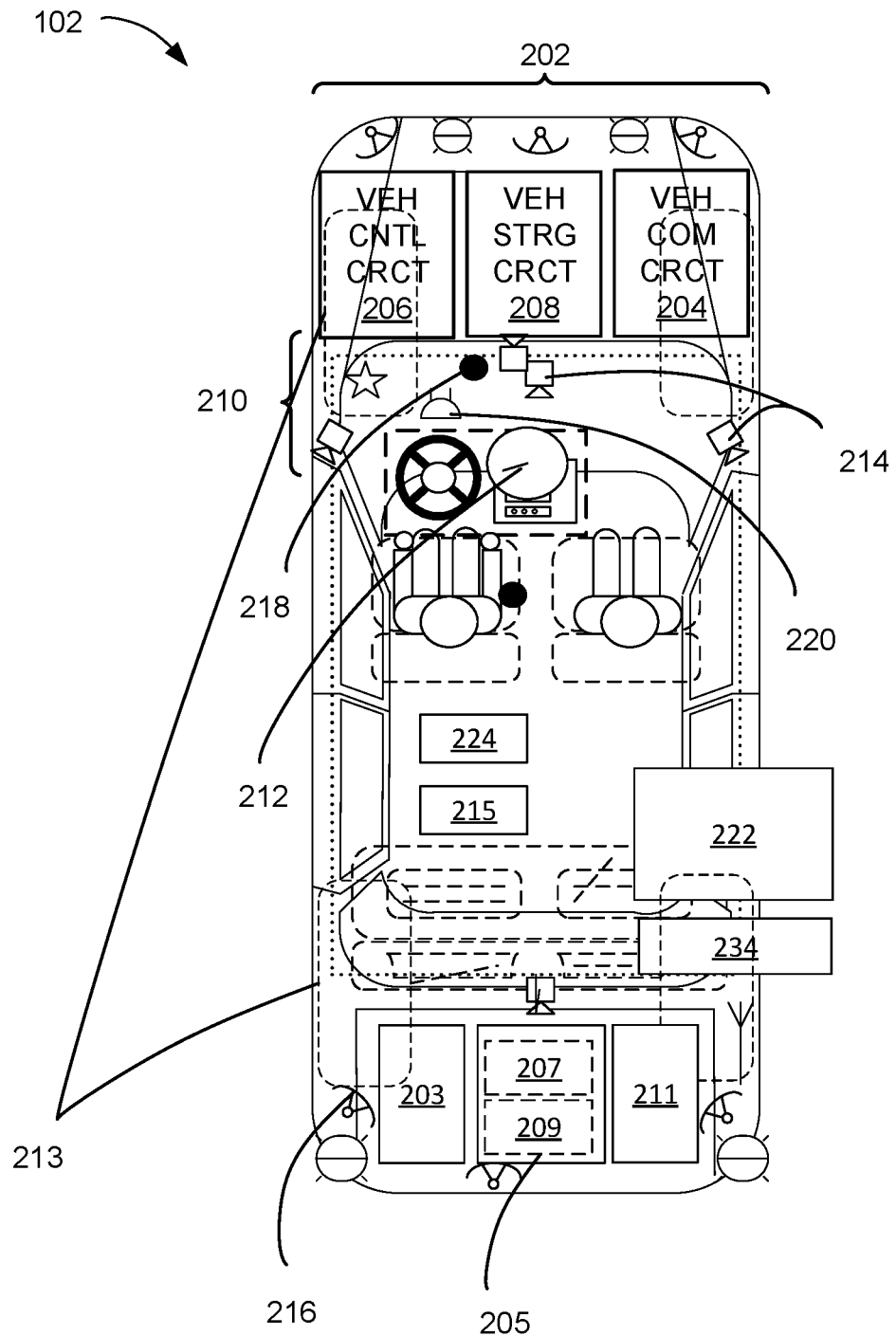
FIG. 2 is an example a top plan view illustration of a first device as a vehicle system.

Referring now to FIG. 2, therein is shown an example of the first device 102 as a vehicle system 202. As an example, the first device 102 can include or interact with the vehicle system 202. The vehicle system 202 can also include one or more of environmental sensors 210. The vehicle system 202 is an object or a machine used for transporting people or goods. The vehicle system 202 can also be capable of providing assistance in maneuvering or operating the object or the machine.

For example, the vehicle system 202 can be different types of vehicles. As a specific example, the vehicle system 202 can be an automobile with only an electric engine 203. As a further specific example, the vehicle system 202 can be a hybrid automobile that can have a hybrid engine 205 (as shown by dotted box in FIG. 2) including a combustion portion 207 (as shown by dotted box in FIG. 2) and an electric portion 209 (as shown by dotted box in FIG. 2). As a further specific example, the vehicle system 202 can be an automobile with only a combustion engine 211 that operates based on non-electrical fuel, such as petroleum, ethanol, hydrogen, diesel, or a combination thereof. For further example, the vehicle system 202 can include a car, a truck, a cart, or a combination thereof.

The vehicle system 202 can include a device, a circuit, one or more specific sensors, or a combination thereof for providing assistance or additional information to control, maneuver, or operate the vehicle system 202. The vehicle system 202 can include a vehicle communication circuit 204, a vehicle control circuit 206, a vehicle storage circuit 208, other interfaces, or a combination thereof.

The vehicle system 202 can also include on-board diagnostics 222 (OBD) that can be accessed by the vehicle control circuit 206. As an example, the vehicle control circuit 206 can access the on-board diagnostics 222 with the vehicle communication circuit 204. The vehicle system 202 can store and retrieve the on-board diagnostics 222 to and from the vehicle storage circuit 208. The on-board diagnostics 222 represent information about the vehicle system 202. For example, the on-board diagnostics 222 can provide the status or the state of the vehicle system 202.

As a specific example, the on-board diagnostics 222 can represent information about a portion of the electric engine 203, the combustion engine 211, or the hybrid engine 205, such as the electric portion 209 or the combustion portion 207, or items that operates with the electric engine 203, the combustion engine 211, or the hybrid engine 205 for either the electric portion 209 or the combustion portion 207. Continuing with the example, the on-board diagnostics 222 can provide information about a battery 224 or an alternator 215 operating in association with the battery 224.

Although the battery 224 can differ in size, capacity, and type, depending on the engine being the electric engine 203, the hybrid engine 205, or the combustion engine 211, the battery 224 provides voltage values that can be read as part of the on-board diagnostics 222. Further, the alternator 215 similar to the battery 224 for the various types of engines, functions to replenish or recharge the battery 224. As the alternator 215 charges the battery 224, the voltage of the battery 224 can also be read as part of the on-board diagnostics 222.

Also as a specific example, the on-board diagnostics 222 can represent a vehicle usage 234 of the vehicle system 202. The vehicle usage 234 can represent various information about or the state of the vehicle system 202. For example, the vehicle usage 234 includes trip calculation, mileage, fuel utilization, average speed, or a combination thereof.

As a further specific example, the on-board diagnostics 222 can represent information about a tire 213. The tire 213 is the portion of the vehicle system 202 that makes direct contact with the road or surface in which the vehicle system 202 propels for movement. For example, the on-board diagnostics 222 can represent the air pressure of the tire 213.

The vehicle storage circuit 208 can include a functional unit or circuit integral to the vehicle system 202 and configured to store and recall information. The vehicle storage circuit 208 can be a volatile memory, a nonvolatile memory, an internal memory, an external memory, or a combination thereof. For example, the vehicle storage circuit 208 can be a nonvolatile storage such as non-volatile random access memory (NVRAM), Flash memory, disk storage, or a volatile storage such as static random access memory (SRAM).

The vehicle storage circuit 208 can store vehicle software, other relevant data, such as input information, information from sensors, processing results, information predetermined or preloaded by the computer system 100 or vehicle manufacturer, or a combination thereof. The vehicle storage circuit 208 can store the information for the on-board diagnostics 222.

The vehicle control circuit 206 can include a function unit or circuit integral to the vehicle system 202 and configured to execute or implement instructions. The vehicle control circuit 206 can execute or implement the vehicle software to provide the intelligence of the vehicle system 202, the computer system 100, or a combination thereof. The vehicle control circuit 206 can respond to requests for the on-board diagnostics 222. The request can be from other parts of the vehicle system 202, the computer system 100, or a combination thereof or external to the computer system 100.

The vehicle control circuit 206 can be implemented in a number of different manners. For example, the vehicle control circuit 206 can be a processor, an application specific integrated circuit (ASIC) an embedded processor, a microprocessor, a hardware control logic, a hardware finite state machine (FSM), a digital signal processor (DSP), or a combination thereof. As a more specific example, the vehicle control circuit 206 can include an engine control unit, one or more central processing unit, or a combination thereof.

The vehicle communication circuit 204 can include a function unit or circuit integral to the vehicle system 202 and configured to enable external communication to and from the vehicle system 202. For example, the vehicle communication circuit 204 can permit the vehicle system 202 to communicate with the first device 102 of FIG. 1, the second device 106 of FIG. 1, the third device 108 of FIG. 1, the fourth device 110 of FIG. 1, the communication path 104 of FIG. 1, or a combination thereof. The vehicle communication circuit 204 can provide the on-board diagnostics 222 to other portions of the vehicle system 202, the computer system 100, or a combination thereof or external to the computer system 100.

The vehicle communication circuit 204 can also function as a communication hub allowing the vehicle system 202 to function as part of the communication path 104 and not limited to be an end point or terminal circuit to the communication path 104. The vehicle communication circuit 204 can include active and passive components, such as microelectronics or an antenna, for interaction with the communication path 104. For example, the vehicle communication circuit 204 can include a modem, a transmitter, a receiver, a port, a connector, or a combination thereof for wired communication, wireless communication, or a combination thereof.

The vehicle communication circuit 204 can couple with the communication path 104 to send or receive information directly between the vehicle communication circuit 204 and the first device 102, the second device 106, the third device 108, the fourth device 110, or a combination thereof as end points of the communication, such as for direct line-of-sight communication or peer-to-peer communication. The vehicle communication circuit 204 can further couple with the communication path 104 to send or receive information through a server or another intermediate device in between end points of the communication.

The vehicle system 202 can further include various interfaces. The vehicle system 202 can include one or more interfaces for interaction or internal communication between functional units or circuits of the vehicle system 202. For example, the vehicle system 202 can include one or more interfaces, such as drivers, firmware, wire connections or buses, protocols, or a combination thereof, for the vehicle storage circuit 208, the vehicle control circuit 206, or a combination thereof.

The vehicle system 202 can further include one or more interfaces for interaction with an occupant, an operator or a driver, a passenger, the user 112 of FIG. 1, or a combination thereof relative to the vehicle system 202. For example, the vehicle system 202 can include a user interface including input or output devices or circuits, such as a screen or touch screen, a speaker, a microphone, a keyboard or other input devices, an instrument panel, or a combination thereof.

The vehicle system 202 can further include one or more interfaces along with switches or actuators for physically controlling movable components of the vehicle system 202. For example, the vehicle system 202 can include the one or more interfaces along with the controlling mechanisms to physically perform and control the maneuvering of the vehicle system 202, such as for automatic driving or maneuvering features.

The functional units or circuits in the vehicle system 202 can work individually and independently of the other functional units or circuits. The vehicle system 202 can work individually and independently from the first device 102, the communication path 104, the second device 106, the third device 108, the fourth device 110, other devices or vehicles, or a combination thereof.

The functional units or circuits described above can be implemented in hardware. For example, one or more of the functional units or circuits can be implemented using the a gate, circuitry, a processor, a computer, integrated circuit, integrated circuit cores, a pressure sensor, an inertial sensor, a microelectromechanical system (MEMS), a passive device, a physical non-transitory memory medium containing instructions for performing the software function, a portion therein, or a combination thereof.

The environmental sensors 210 are each a device for detecting or identifying environment of the vehicle system 202. The environmental sensors 210 can detect, identify, determine, or a combination thereof for the vehicle system 202, such as for status or movement thereof. The environmental sensors 210 can detect, identify, determine, or a combination thereof for environment within a cabin of the vehicle system 202, an environment external to and surrounding the vehicle system 202.

For example, the environmental sensors 210 can include a location-movement sensor 212, a visual sensor 214, a radar sensor 216, an accessory sensor 218, a volume sensor 220, or a combination thereof. The location-movement sensor 212 can identify or calculate a geographic location of the vehicle system 202, determine a movement of the vehicle system 202. Examples of the location-movement sensor 212 can include an accelerometer, a speedometer, a GPS receiver or device, a gyroscope or a compass, or a combination thereof. The vehicle system 202 can include the environmental sensors 210 other than or in addition to the location-movement sensor 212, such as thermal sensor. The thermal sensor can capture and provide temperature readings for portions of the vehicle system 202. The thermal sensor can also capture and provide temperature readings external to the vehicle system 202.

The visual sensor 214 can include a sensor for detecting or determining visual information representing the environment external to and surrounding the vehicle system 202. The visual sensor 214 can include a camera attached to or integral with the vehicle system 202. For example, the visual sensor 214 can include a camera, such as forward facing camera, a rear-view or back-up camera, a side-view or a blind-spot camera, or a combination thereof. Also for example, the visual sensor 214 can include an infrared sensor or a night vision sensor.

The visual sensor 214 can further include a camera on the vehicle system 202 connected to and interacting with the first device 102, the second device 106, the third device 108, the fourth device 110, or a combination thereof. The visual sensor 214 can further include a cabin camera for detecting or determining visual information inside the vehicle or cabin of the vehicle.

The radar sensor 216 can include an object-detection system, device, or circuit. The radar sensor 216 can determine or identify an existence of an object or a target, such as an obstacle or another vehicle, external to the vehicle system 202, a relative location or a distance between the object or the target and the vehicle system 202.

The radar sensor 216 can utilize radio waves to determine or identify an existence of the object or the target, the relative location or a distance from the vehicle system 202. For example, the radar sensor 216 can include a proximity sensor or warning system, such as for an area in front of, behind, adjacent to or on a side of, or a combination thereof geographically or physically relative to the vehicle system 202.

The accessory sensor 218 can include a sensor for determining or detecting a status of a subsystem or a feature of the vehicle system 202. The accessory sensor 218 can determine or detect the status or a setting for windshield wipers, turn signals, gear setting, headlights, or a combination thereof.

The volume sensor 220 can include a sensor for detecting or determining sounds for the vehicle system 202. The volume sensor 220 can include a microphone for detecting or determining sounds within a cabin of the vehicle system 202. The volume sensor 220 can further include a circuit for detecting or determining a volume level or an output level of speakers within the vehicle system 202.

The vehicle system 202 can use one or more of the environmental sensors 210 to generate the on-board diagnostics 222 describing or representing information regarding the environment within or surrounding the vehicle system 202. The on-board diagnostics 222 can be further processed with the vehicle control circuit 206, stored in the vehicle storage circuit 208, communicated to another device through the vehicle control circuit 206, or a combination thereof.

The vehicle system 202 can further include a user device or a mobile device illustrated in FIG. 1. For example, the vehicle system 202 can include the first device 102. As a more specific example, the vehicle communication circuit 204, the vehicle control circuit 206, the vehicle storage circuit 208, one or more interfaces, or a combination thereof can be included in or make up the first device 102 included in or integral with the vehicle system 202.

Also as a more specific example, the vehicle system 202 can include or be integral with the first device 102 including an embedded computer system, an infotainment system, a smart driving or a driver assistance system, a self-driving or a maneuvering system for the vehicle, or a combination thereof.

Figure 3:
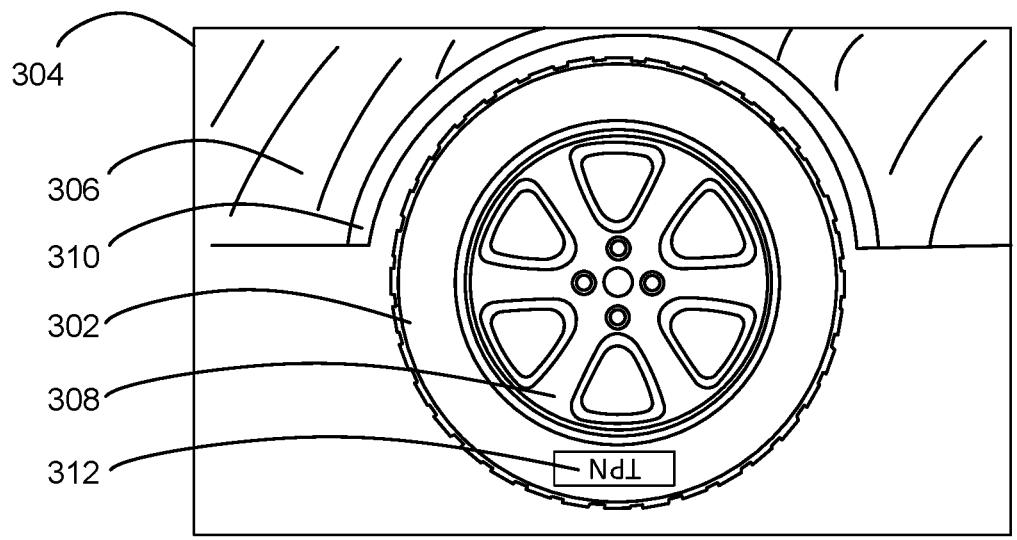
FIG. 3 is an example of a first view of a target tire.

Referring now to FIG. 3, therein is shown an example of a first view of a target tire 302. The target tire 302 is a unique instance and can represent any unique instance of the tire 213 of FIG. 2 to be analyzed by the computer system 100. For brevity and clarity, the description of the target tire 302 will be for one specific instance of the tire 213 although it is understood that other instances of the tire 213 can also represent the target tire 302 but the information and the processing will be unique for each unique specific instance of the tire 213.

The target tire 302 can be determined or selected by the computer system 100. For example, the computer system 100 can identify the target tire 302 based on the specific axle and side of a specific instance of the vehicle system 202. As a specific example, the computer system 100 can determine, select, or identify the target tire 302 as the tire 213 on the front axle on the right side of the vehicle system 202.

The target tire 302 can also be designated by the user 112. As an example, the user 112 can select the target tire 302 with the computer system 100. Also as an example, the user 112 can utilize direct user input 114 when the target tire 302 is moved to a different axle, a different side, a different instance of the vehicle system 202, or a combination thereof. Alternatively, the computer system 100 can also track the target tire 302 as its location or association with the vehicle system 202 is changed, such as a tire rotation on the vehicle system 202.

The first view of the target tire 302 is an example of a tire image 304. The tire image 304 is an image, video, or a combination thereof of a target tire 302. The tire image 304 can be captured manually or opportunistically. For example, the tire image 304 can be captured manually by the user 112 or invoked capturing by the user 112 with the computer system 100. The tire image 304 can be captured by the first device 102 of FIG. 1, the second device 106 of FIG. 1, the third device 108 of FIG. 1, the fourth device 110 of FIG. 1, the vehicle system 202 of FIG. 2, or a combination thereof.

The tire image 304 can include not only the target tire 302 but also for an associated structure 306. The associated structure 306 refers to items where the tire 213 attaches to or surrounding the tire 213. For example, the associated structure 306 can include a rim 308 surrounded by the target tire 302. The tire 213 is attached to the rim 308 and the rim 308 provides the structure connection to the rest of the vehicle system 202. Also for example, the associated structure 306 can also include a fender 310 of the vehicle system 202. The fender 310 is part of the vehicle system 202 that frames the wheel well for the tire 213.

In this example, the first view depicts a tire part number 312 along a sidewall of the target tire 302. The tire part number 312 is the markings on the target tire 302 that identifies the manufacturer and model of the tire 213. The tire part number 312 can be identified by the computer system 100 utilizing optical character recognition (OCR). The tire part number 312 can also be identified by the user 112 utilizing direct user input 114.

Figure 4:
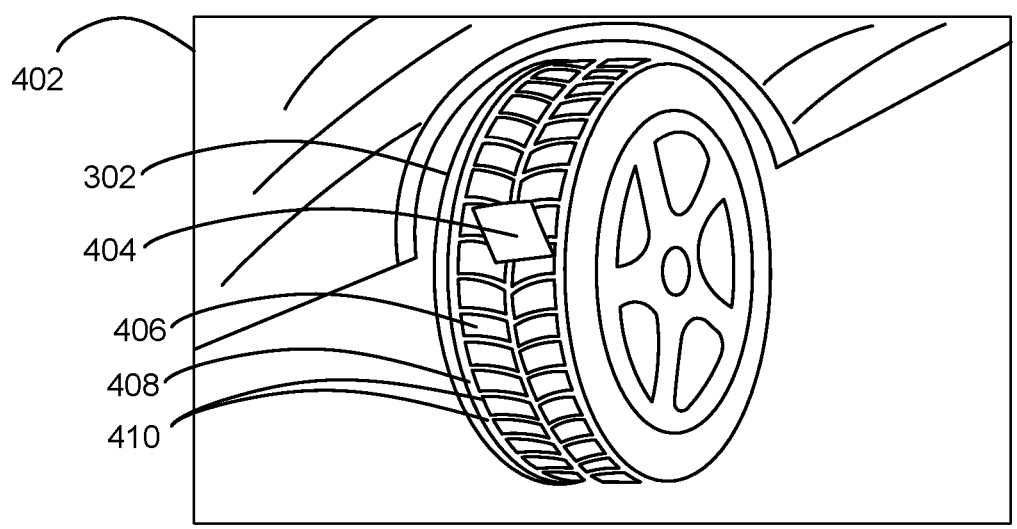
FIG. 4 is an example of a second view of the target tire.

Referring now to FIG. 4, therein is shown an example of a second view of the target tire 302. The second view of the target tire 302 is an example of a captured image 402. The captured image 402 is the tire image 304 recorded by the computer system 100 of FIG. 1 at an earlier time. For brevity and clarity, the capture image 402 is described as a single instance of an earlier recording of the tire image 304 of FIG. 3 although it is understood that the capture image 402 can represent a number of recorded instances of the tire image 304. Also, FIG. 4 can also represent the tire image 304 of FIG. 3 for the target tire 302 but from a different angle, perspective view, orientation, or a combination thereof.

The captured image 402 can depict different aspects of the target tire 302. For example, the capture image 402 can provide views of the target tire 302 at different angles. Also for example, the captured image 402 can also provide views, different or similar or same, of the target tire 302 based on lighting or debris 404 on the target tire 302.

The debris 404 are foreign objects that are not a part of the tire 213 of FIG. 2. For example, the debris 404 can be an object that touches, enters, punctures, or intrudes the tire 213. As a further example, debris 404 can be an object that covers, blocks, or masks a view of the tire 213.

The captured image 402 can be recorded by the same or different portions of the computer system 100 as those that recorded the tire image 304 or those that recorded different instances of the captured image 402. As an example, the captured image 402 can be gathered or recorded by the first device 102 of FIG. 1, the second device 106 of FIG. 1, the third device 108 of FIG. 1, the fourth device 110 of FIG. 1, the vehicle system 202 of FIG. 2, or a combination thereof. The captured image 402 can be stored on the first device 102, the second device 106, the third device 108, the fourth device 110, the vehicle system 202, or a combination thereof.

The second view provides a tread 406, grooves 408, and a tread depth 410 of the target tire 302. The tread 406 is the portion of the target tire 302 at the circumference and makes contact with the surface below the vehicle system 202. The grooves 408 are the channels that run circumferentially and the instances of the channels laterally span around the tire 213. The tread depth 410 is the vertical measurement between the top of the tread 406 of each of the grooves 408 to the bottom of the grooves 408.

Figure 5:
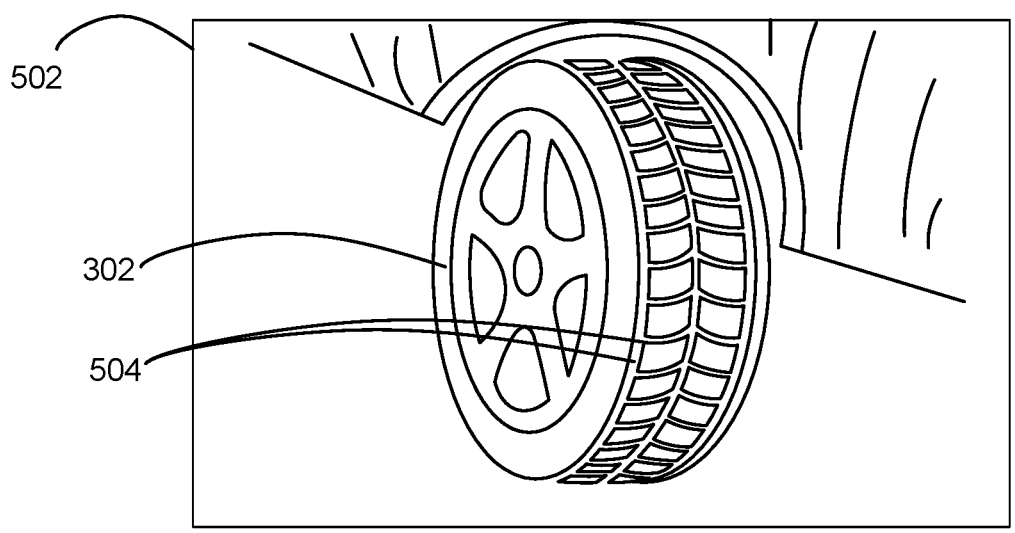
FIG. 5 is an example of a third view of the target tire.

Referring now to FIG. 5, therein is shown an example of a third view of the target tire 302. The third view can be an example of a composite image 502. The composite image 502 is the compilation or an aggregation of the captured image 402 of FIG. 4, the tire image 304 of FIG. 3, or a combination thereof of the target tire 302. As an example, the composite image 502 can include the tire image 304. Also, FIG. 5 can also represent the tire image 304 of FIG. 3 for the target tire 302 but from a different angle, perspective view, orientation, or a combination thereof.

Further for example, the composite image 502 provides an image of the target tire 302 with additional information for the target tire 302 that can be utilized for analysis. The additional information for the target tire 302 can be more information than what is available, detectable, extractable, visible, or a combination thereof than any one instance of the tire image 304. As a specific example, the composite image 502 can provide the additional information of the target tire 302 and the associated structures 306 of FIG. 3 free of debris 404 of FIG. 4.

As a further example, the composite image 502 can provide the additional information of the target tire 302 to determine a target tread depth 504 that may not be attainable, detectable, extractable, visible, calculatable, or a combination thereof in one or some subset instances of the tire image 304. The target tread depth 504 is the measurement of the tread depth 410 of the target tire 302.

The composite image 502 can be generated on the first device 102 of FIG. 1, the second device 106 of FIG. 1, the third device 108 of FIG. 1, the fourth device 110 of FIG. 1, the vehicle system 202 of FIG. 2, or a combination thereof. The composite image 502 can be stored on the first device 102, the second device 106, the third device 108, the fourth device 110, the vehicle system 202, or a combination thereof.

Figure 6:
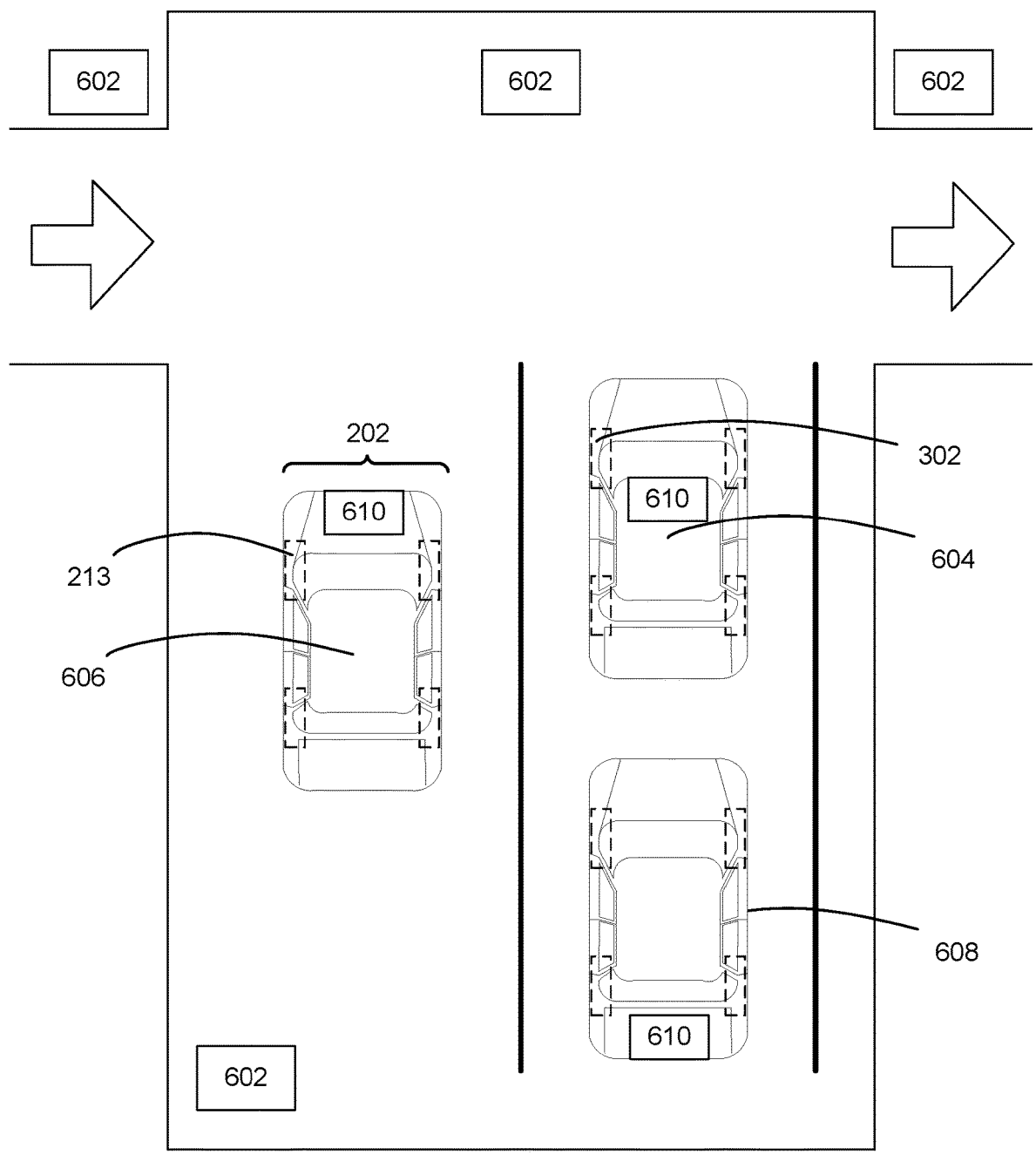
FIG. 6 is an example of a top view of an environment for operation of the computer system.

Referring now to FIG. 6, therein is shown an example top view of an environment for operation of the computer system 100. The example shown in FIG. 6 depicts an environment where the computer system 100 is operating in a parking facility, a storage facility, a vehicle service facility, or a combination thereof. As a specific example, the environment can be a parking facility or a parking lot for a fleet of vehicles. For this example, the fleet can include a fleet of delivery cars, rental cars, rental trucks, airplanes, trailers, or a combination thereof where the vehicle system 202 located in the environment has one or more instances of the tire 213 of the same or different types.

The environment can also include external capture devices 602 to capture images, videos, or a combination thereof. The external capture devices 602 can take still images, videos, multi-media recordings, or a combination thereof of the tire 213 or the target tire 302. The external capture devices 602 can be operated both manually as well as opportunistically capture the tire image 304 of FIG. 3 or the different instances of the tire image 304 in the environment. The external capture devices 602 can be the first device 102 of FIG. 1, the second device 106 of FIG. 1, the third device 108 of FIG. 1, the fourth device 110 of FIG. 1, or a combination thereof.

The term "opportunistic" or opportunistically" capture refers to when an object comes in view of a device capable of taking an image, a video, a multimedia recording, or a combination thereof of the object without action to move or orient the device to capture the object being captured. The opportunistic capturing is done without a manual or automated action for the specific purpose to move or orient the capturing device to view the object being captured.

In this example, FIG. 6 depicts a number of instances of the vehicle system 202. For brevity and clarity, the number of instances of the vehicle system 202 can include a first vehicle 604, a second vehicle 606, and a third vehicle 608. The designation of the "first", "second", and "third" is for convenience and not intended to describe relative importance. In this example, the first vehicle 604, the second vehicle 606, the third vehicle 608, or a combination thereof can represent different types, similar types, or a combination thereof of the vehicle system 202.

Also for brevity and clarity, the target tire 302 will be described as part of the first vehicle 604 and located at the front and at the driver side of the first vehicle 604. In this example, the tire image 304, the captured image 402 of FIG. 4, or a combination thereof is that instance of the target tire 302 of the first vehicle 604.

Further regarding the external capture devices 602, the external capture devices 602 can be placed within or proximate the environment to opportunistically capture the tire image 304. For example, the one or more of the external capture devices 604 can be placed or located at the entry or exit of the environment such that one or more of the external capture devices 604 can view and take the tire image 304 of the target tire 302 as the vehicle system 202 enters or exits the environment.

The external capture devices 602 can operate based on time intervals, triggering conditions or events, continuously, or a combination thereof. Each of the external capture devices 602 can be activated similarly or differently. As an example, the external capture devices 602 can be operated based on motion detection. Also for example, the external capture devices 602 can be operated based on pressure sensor placed in the environment as the vehicle system 202 with a target weight crosses over the pressure sensor.

Further for example, the external capture devices 602 at predetermined locations can be operated continuously during predetermined time periods, such as operating hours or hours of busy ingress and egress to and from the environment. Yet further for example, the external capture devices 602 in servicing stations, such as gas pumps, electric charging stations, or repair area in the environment, can be operated continuously or a trigger at the beginning or end of service.

The computer system 100 can identify and detect each of the tire image 304, the captured image 402, or a combination thereof from the external capture devices 602 to the unique instance of the tire 213. The computer system 100 can further associate the target tire 302 to the first vehicle 604 and the correct position with the first vehicle 604.

Returning to the description of the vehicle system 202, the vehicle system 202 can include an embedded capture device 610. The embedded capture device 610 are included in, part of, installed within the vehicle system 202. The embedded capture device 610 is not part of the environment and associated with the vehicle system 202. The embedded capture device 610 can include a mechanism or system to capture a still picture, a video, a multimedia recording, or a combination thereof.

As a specific example in this figure, the first vehicle 604, the second vehicle 606, the third vehicle 608, or a combination thereof can each include the embedded capture device 610. The instance of the embedded capture device 610 can be same, similar, or different between the first vehicle 604, the second vehicle 606, the third vehicle 608, or other instances of the vehicle system 202 within or proximate to the environment. The functions, performance, or a combination thereof for each instance of the embedded capture device 610 associated with the first vehicle 604, the second vehicle 606, the third vehicle 608, or other instances of the vehicle system 202 can be the same, similar, or different.

As the vehicle system 202, the first vehicle 604, the second vehicle 606, the third vehicle 608, or a combination thereof moves around the environment, the embedded capture device 610 can opportunistically take images, videos, multimedia recordings, or a combination thereof. The embedded capture devices 610 can operate based on time intervals, triggering conditions or events, continuously, or a combination thereof. Each of the embedded capture devices 610 can be activated similarly or differently.

For example, one or more of the embedded capture devices 610 can view and take the tire image 304 of the target tire 302 as the vehicle system 202 moves proximate to the first vehicle 604, the second vehicle 606, the third vehicle 608, or other instances of the vehicle system 202. As an example, the embedded capture devices 610 can be operated based on detection of the first vehicle 604, the second vehicle 606, the third vehicle 608, or other instances of the vehicle system 202. Also for example, the embedded capture devices 610 can be operated based on the movement of the vehicle system 202, such as when the vehicle system 202 is backing up or in reverse.

Further for example, the embedded capture devices 610 can be operated continuously at predetermined locations based on the location of the vehicle system 202. Yet further for example, the embedded capture devices 610 in vehicle systems 202 can be operated continuously or a trigger when the vehicle system 202 is in operation.

As the vehicle system 202, the first vehicle 604, the second vehicle 606, the third vehicle 608, or a combination thereof is parked or not in motion in the environment, the embedded capture device 610 can opportunistically take images, videos, multimedia recordings, or a combination thereof. For example, one or more of the embedded capture devices 610 can view and take the tire image 304 of the target tire 302 as the vehicle system 202 is parked or not in motion in the environment. The embedded capture devices 610 in the vehicle system 202 that is parked or not in motion can operated based on time intervals, triggering conditions or events, continuously or a combination thereof.

As an example, the embedded capture devices 610 can be operated based on motion detection while the vehicle system 202 is parked or not in motion. Also for example, the embedded capture devices 610 can be operated at predetermined locations when the vehicle system 202 is parked or not in motion. As a further example, the embedded capture devices 610 can be operated continuously in the vehicle system 202 that is parked or not in motion, such as operating hours or hours of busy traffic proximate to the vehicle system 202.

Figure 7:
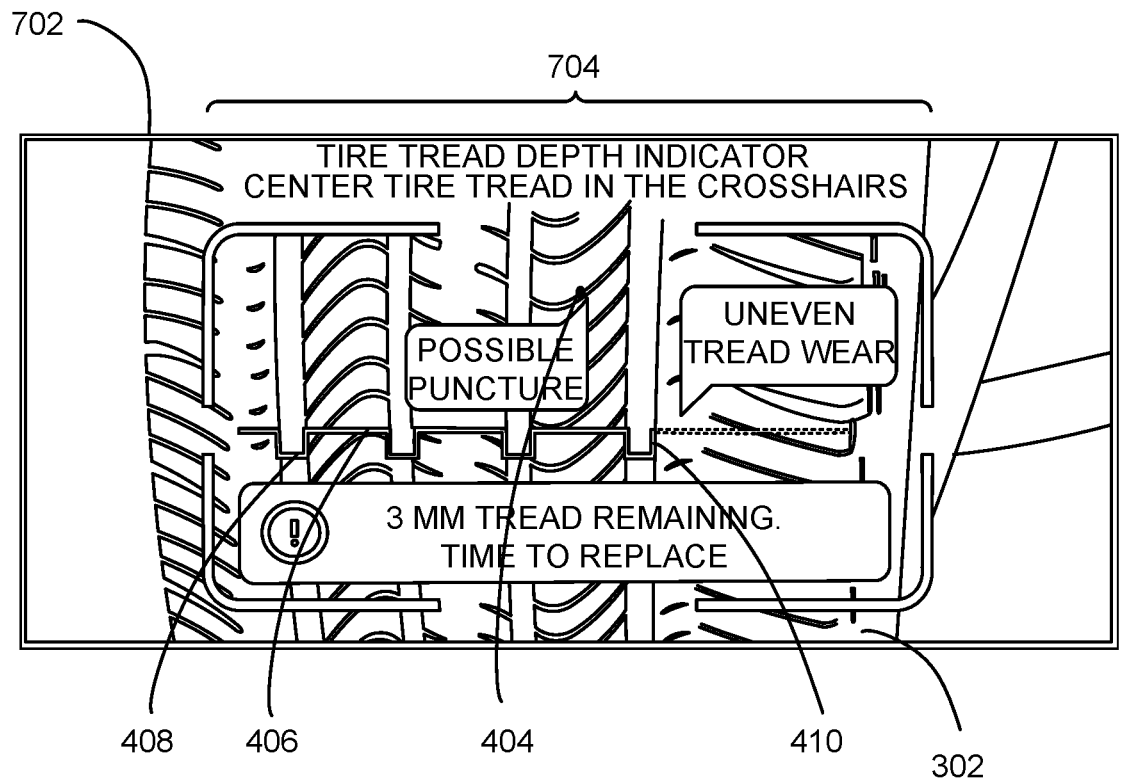
FIG. 7 is an example of an augmented reality image for the target tire.

Referring now to FIG. 7, therein is shown an example of an augmented reality image 702 for the target tire 302. The augmented reality image 702 is a computer-generated image that is superimposed or overlaid onto an object to provide additional information about the object. The augmented reality image 702 can include rendering in color, text, graphical images, animation, or a combination thereof to provide information about the object or aspects or attributes of the object.

In this example depicted in FIG. 7, the target tire 302 can be represented by the tire image 304 of FIG. 3, the captured image 402 of FIG. 4, the composite image 502 of FIG. 5, or the real world view of the target tire 302. The augmented reality image 702, the target tire 302, or a combination thereof can be displayed on the first device 102 of FIG. 1, the second device 106 of FIG. 1, the third device 108 of FIG. 1, the fourth device 110 of FIG. 1, or a combination thereof.

The augmented reality image 702 can provide additional information about the target tire 302. For example, the augmented reality image 702 can provide a visual representation of a wear risk 704 for the target tire 302. The wear risk 704 is the level of potential safety risks associated with the use and use pattern of the target tire 302.

The wear risk 704 can include various factors about the target tire 302. For example, the wear risk 704 can include the tread depth 410, variations of the tread depth 410 from one sidewall to the opposite sidewall of the target tire 302, and variations of the tread 406 between the grooves 408 and lateral to the outermost instances of the grooves 408.

Also for example, the wear risk 704 can also include information about debris 404 attached to or shown associated with the target tire 302. As a specific example, the wear risk 704 can be associated with the debris 404 that can indicate or cause a puncture.

The augmented reality image 702 can provide a visual representation of the wear risk 704 by displaying colors, texts, graphical images, or a combination thereof. For example, the augmented reality image 702 can include text identifying a possible puncture or uneven wear of the tread 406 of the target tire 302. As a further example, the augmented reality image 702 can include graphical image to represent the variations of the tread 406 between the grooves 408 and lateral to the outermost instances of the grooves 408. As a further example, the augmented reality image 702 can include colors depicting the remaining use of the target tire 302.

The augmented reality image 702 can be generated on the first device 102, the second device 106, the third device 108, the fourth device 110, the vehicle system 202, or a combination thereof. The augmented reality image 702 can be stored on the first device 102, the second device 106, the third device 108, the fourth device 110, the vehicle system 202, or a combination thereof.

Figure 8:
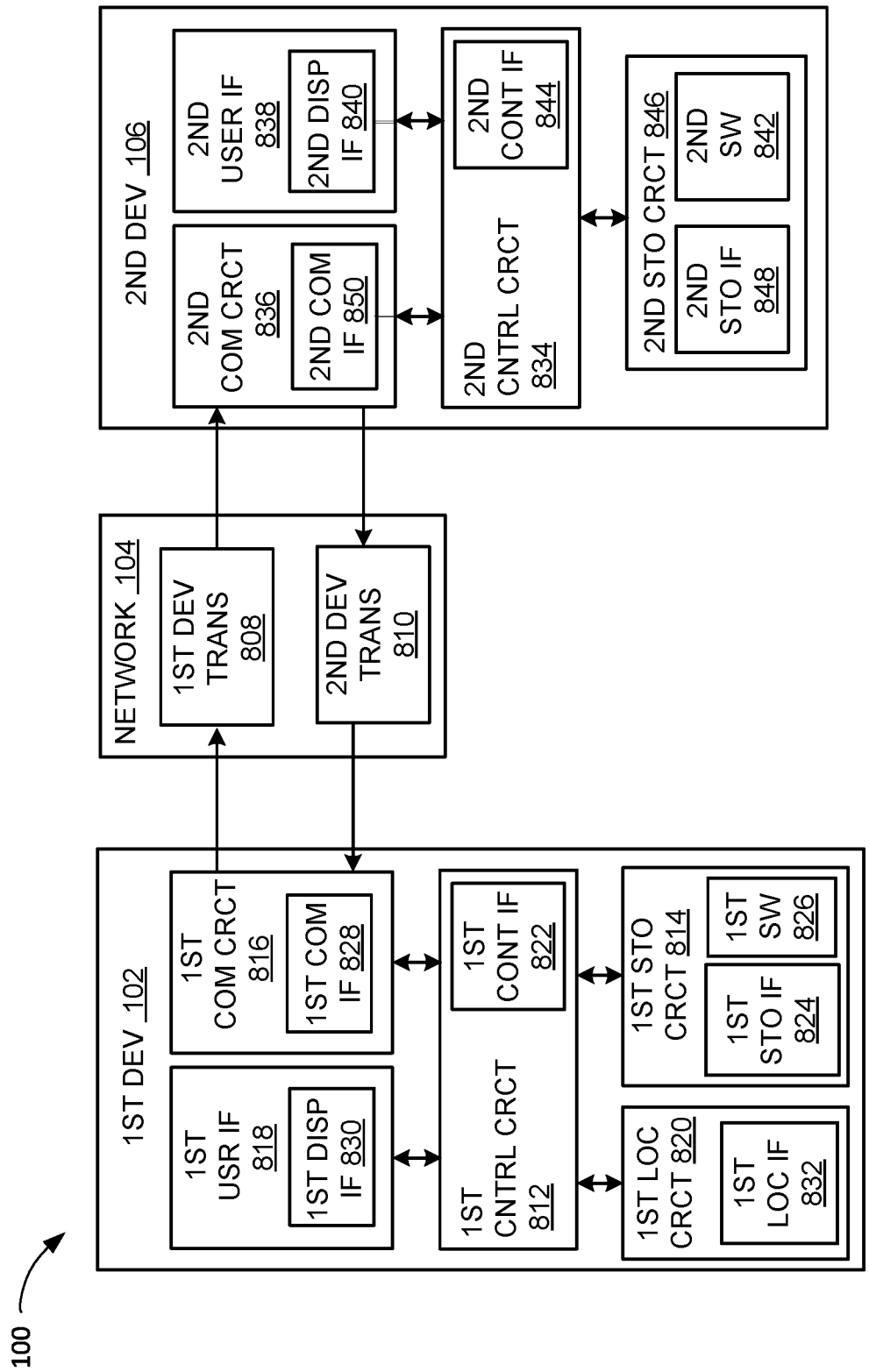
FIG. 8 is an exemplary block diagram of a first device and a second device of the computer system.

Referring now to FIG. 8, therein is shown an example of a block diagram of a portion of the computer system 100. FIG. 8 depicts the portion of the computer system 100 including the first device 102, the communication path 104, and the second device 106. The first device 102 can send information in a first device transmission 308 over the communication path 104 to the second device 106. The second device 106 can send information in a second device transmission 310 over the communication path 104 to the first device 102.

For illustrative purposes, the computer system 100 is shown with the first device 102 as a client device, although it is understood that the computer system 100 can include the first device 102 as a different type of device. For example, the first device 102 can be a server including a display interface.

Also for illustrative purposes, the computer system 100 is shown with the second device 106 as a server, although it is understood that the computer system 100 can include the second device 106 as a different type of device. For example, the second device 106 can be a client device.

Also for illustrative purposes, the computer system 100 is shown with interaction between the first device 102 and the second device 106. However, it is understood that the first device 102 can similarly interact with the third device 108 of FIG. 1, the fourth device 110 of FIG. 1, or a combination thereof. Similarly, the second device 106 can similarly interact with the third device 108, the fourth device 110, or a combination thereof.

Further, for illustrative purposes, the computer system 100 is shown with interaction between the first device 102 and the second device 106, although it is understood that the first device 102 can similarly interact another instance of the first device 102, the third device 108, the fourth device 110, or a combination thereof. Similarly, the second device 106 can similarly interact with another instance of the second device 106, the third device 108, the fourth device 110, or a combination thereof.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control circuit 812, a first storage circuit 814, a first communication circuit 816, and a first user interface 818, and a first location circuit 820. The first control circuit 812 can include a first control interface 822. The first control circuit 812 can execute a first software 826 to provide the intelligence of the computer system 100.

The first control circuit 812 can be implemented in a number of different manners. For example, the first control circuit 812 can be a processor, an application specific integrated circuit (ASIC) an embedded processor, a microprocessor, a hardware control logic, a hardware finite state machine (FSM), a digital signal processor (DSP), or a combination thereof. The first control interface 822 can be used for communication between the first control circuit 812 and other functional units or circuits in the first device 102. The first control interface 822 can also be used for communication that is external to the first device 102.

The first control interface 822 can receive information from the other functional units/circuits or from external sources, or can transmit information to the other functional units/circuits or to external destinations. The external sources and the external destinations refer to sources and destinations external to the first device 102.

The first control interface 822 can be implemented in different ways and can include different implementations depending on which functional units/circuits or external units/circuits are being interfaced with the first control interface 822. For example, the first control interface 822 can be implemented with a pressure sensor, an inertial sensor, a microelectromechanical system (MEMS), optical circuitry, waveguides, wireless circuitry, wireline circuitry, or a combination thereof.

The first storage circuit 814 can store the first software 826. The first storage circuit 314 can also store the relevant information, such as data representing incoming images, data representing previously presented image, sound files, or a combination thereof.

The first storage circuit 814 can be a volatile memory, a nonvolatile memory, an internal memory, an external memory, or a combination thereof. For example, the first storage circuit 814 can be a nonvolatile storage such as non-volatile random access memory (NVRAM), Flash memory, disk storage, or a volatile storage such as static random access memory (SRAM).

The first storage circuit 814 can include a first storage interface 824. The first storage interface 824 can be used for communication between the first storage circuit 814 and other functional units or circuits in the first device 102. The first storage interface 824 can also be used for communication that is external to the first device 102.

The first storage interface 824 can receive information from the other functional units/circuits or from external sources, or can transmit information to the other functional units/circuits or to external destinations. The external sources and the external destinations refer to sources and destinations external to the first device 102.

The first storage interface 824 can include different implementations depending on which functional units/circuits or external units/circuits are being interfaced with the first storage circuit 814. The first storage interface 824 can be implemented with technologies and techniques similar to the implementation of the first control interface 822.

The first communication circuit 816 can enable external communication to and from the first device 102. For example, the first communication circuit 316 can permit the first device 102 to communicate with the second device 106, an attachment, such as a peripheral device or a desktop computer, and the communication path 104.

The first communication circuit 816 can also function as a communication hub allowing the first device 102 to function as part of the communication path 104 and not limited to be an end point or terminal circuit to the communication path 104. The first communication circuit 816 can include active and passive components, such as microelectronics or an antenna, for interaction with the communication path 104.

The first communication circuit 816 can include a first communication interface 828. The first communication interface 828 can be used for communication between the first communication circuit 816 and other functional units or circuits in the first device 102. The first communication interface 828 can receive information from the other functional units/circuits or can transmit information to the other functional units or circuits.

The first communication interface 828 can include different implementations depending on which functional units or circuits are being interfaced with the first communication circuit 816. The first communication interface 828 can be implemented with technologies and techniques similar to the implementation of the first control interface 822.

The first user interface 818 allows the user 114 of FIG. 1 to interface and interact with the first device 102. The first user interface 818 can include an input device and an output device. Examples of the input device of the first user interface 818 can include a keypad, a touchpad, soft-keys, a keyboard, a microphone, an infrared sensor for receiving remote signals, or any combination thereof to provide data and communication inputs.

The first user interface 318 can include a first display interface 830. The first display interface 830 can include an output device. The first display interface 830 can include a display, a projector, a video screen, a speaker, or any combination thereof.

The first control circuit 812 can operate the first user interface 818 to display information generated by the computer system 100. The first control circuit 812 can also execute the first software 826 for the other functions of the computer system 100, including receiving location information from the first location circuit 820. The first control circuit 812 can further execute the first software 826 for interaction with the communication path 104 via the first communication circuit 816.

The first location circuit 820 can generate location information, current heading, current acceleration, and current speed of the first device 102, as examples. The first location circuit 820 can be implemented in many ways. For example, the first location circuit 820 can function as at least a part of the global positioning system, an inertial vehicle system, a cellular-tower location system, a pressure location system, or any combination thereof. Also, for example, the first location circuit 820 can utilize components such as an accelerometer or global positioning system (GPS) receiver.

The first location circuit 820 can include a first location interface 832. The first location interface 832 can be used for communication between the first location circuit 820 and other functional units or circuits in the first device 102. The first location interface 832 can also be used for communication external to the first device 102.

The first location interface 832 can receive information from the other functional units/circuits or from external sources, or can transmit information to the other functional units/circuits or to external destinations. The external sources and the external destinations refer to sources and destinations external to the first device 102.

The first location interface 832 can include different implementations depending on which functional units/circuits or external units/circuits are being interfaced with the first location circuit 820. The first location interface 832 can be implemented with technologies and techniques similar to the implementation of the first control circuit 812.

The second device 106 can be optimized for implementing an embodiment of the present invention in a multiple device embodiment with the first device 102. The second device 106 can provide the additional or higher performance processing power compared to the first device 102. The second device 106 can include a second control circuit 834, a second communication circuit 836, a second user interface 838, and a second storage circuit 846.

The second user interface 838 allows a user (not shown) to interface and interact with the second device 106. The second user interface 838 can include an input device and an output device. Examples of the input device of the second user interface 838 can include a keypad, a touchpad, softkeys, a keyboard, a microphone, or any combination thereof to provide data and communication inputs. Examples of the output device of the second user interface 838 can include a second display interface 840 of FIG. 8. The second display interface 840 can include a display, a projector, a video screen, a speaker, or any combination thereof.

The second control circuit 834 can execute a second software 842 of FIG. 8 to provide the intelligence of the second device 106 of the computer system 100. The second software 842 can operate in conjunction with the first software 826. The second control circuit 834 can provide additional performance compared to the first control circuit 812.

The second control circuit 834 can operate the second user interface 838 to display information. The second control circuit 834 can also execute the second software 842 for the other functions of the computer system 100, including operating the second communication circuit 836 to communicate with the first device 102 over the communication path 104.

The second control circuit 834 can be implemented in a number of different manners. For example, the second control circuit 834 can be a processor, an embedded processor, a microprocessor, hardware control logic, a hardware finite state machine (FSM), a digital signal processor (DSP), or a combination thereof.

The second control circuit 834 can include a second control interface 844 of FIG. 8. The second control interface 844 can be used for communication between the second control circuit 834 and other functional units or circuits in the second device 106. The second control interface 844 can also be used for communication that is external to the second device 106.

The second control interface 844 can receive information from the other functional units/circuits or from external sources, or can transmit information to the other functional units/circuits or to external destinations. The external sources and the external destinations refer to sources and destinations external to the second device 106.

The second control interface 844 can be implemented in different ways and can include different implementations depending on which functional units/circuits or external units/circuits are being interfaced with the second control interface 844. For example, the second control interface 844 can be implemented with a pressure sensor, an inertial sensor, a microelectromechanical system (MEMS), optical circuitry, waveguides, wireless circuitry, wireline circuitry, or a combination thereof.

A second storage circuit 846 can store the second software 842. The second storage circuit 846 can also store the information such as data representing incoming images, data representing previously presented image, sound files, or a combination thereof. The second storage circuit 846 can be sized to provide the additional storage capacity to supplement the first storage circuit 814.

For illustrative purposes, the second storage circuit 846 is shown as a single element, although it is understood that the second storage circuit 846 can be a distribution of storage elements. Also for illustrative purposes, the computer system 100 is shown with the second storage circuit 846 as a single hierarchy storage system, although it is understood that the computer system 100 can include the second storage circuit 846 in a different configuration. For example, the second storage circuit 846 can be formed with different storage technologies forming a memory hierarchal system including different levels of caching, main memory, rotating media, or off-line storage.

The second storage circuit 846 can be a volatile memory, a nonvolatile memory, an internal memory, an external memory, or a combination thereof. For example, the second storage circuit 846 can be a nonvolatile storage such as non-volatile random access memory (NVRAM), Flash memory, disk storage, or a volatile storage such as static random access memory (SRAM).

The second storage circuit 846 can include a second storage interface 848. The second storage interface 848 can be used for communication between the second storage circuit 846 and other functional units or circuits in the second device 106. The second storage interface 848 can also be used for communication that is external to the second device 106.

The second storage interface 848 can receive information from the other functional units/circuits or from external sources, or can transmit information to the other functional units/circuits or to external destinations. The external sources and the external destinations refer to sources and destinations external to the second device 106.

The second storage interface 848 can include different implementations depending on which functional units/circuits or external units/circuits are being interfaced with the second storage circuit 846. The second storage interface 848 can be implemented with technologies and techniques similar to the implementation of the second control interface 844.

The second communication circuit 836 can enable external communication to and from the second device 106. For example, the second communication circuit 836 can permit the second device 106 to communicate with the first device 102 over the communication path 104.

The second communication circuit 836 can also function as a communication hub allowing the second device 106 to function as part of the communication path 104 and not limited to be an end point or terminal unit or circuit to the communication path 104. The second communication circuit 336 can include active and passive components, such as microelectronics or an antenna, for interaction with the communication path 104.

The second communication circuit 836 can include a second communication interface 850. The second communication interface 850 can be used for communication between the second communication circuit 836 and other functional units or circuits in the second device 106. The second communication interface 850 can receive information from the other functional units/circuits or can transmit information to the other functional units or circuits.

The second communication interface 850 can include different implementations depending on which functional units or circuits are being interfaced with the second communication circuit 836. The second communication interface 850 can be implemented with technologies and techniques similar to the implementation of the second control interface 844.

The first communication circuit 816 can couple with the communication path 104 to send information to the second device 106 in the first device transmission 808. The second device 106 can receive information in the second communication circuit 836 from the first device transmission 808 of the communication path 104.

The second communication circuit 836 can couple with the communication path 104 to send information to the first device 102 in the second device transmission 810. The first device 102 can receive information in the first communication circuit 816 from the second device transmission 810 of the communication path 104. The computer system 100 can be executed by the first control circuit 812, the second control circuit 834, or a combination thereof. For illustrative purposes, the second device 106 is shown with the partition containing the second user interface 838, the second storage circuit 846, the second control circuit 834, and the second communication circuit 836, although it is understood that the second device 106 can include a different partition. For example, the second software 842 can be partitioned differently such that some or all of its function can be in the second control circuit 834 and the second communication circuit 836. Also, the second device 106 can include other functional units or circuits not shown in FIG. 8 for clarity.

The functional units or circuits in the first device 102 can work individually and independently of the other functional units or circuits. The first device 102 can work individually and independently from the second device 106 and the communication path 104.

The functional units or circuits in the second device 106 can work individually and independently of the other functional units or circuits. The second device 106 can work individually and independently from the first device 102 and the communication path 104.

The functional units or circuits described above can be implemented in hardware. For example, one or more of the functional units or circuits can be implemented using the a gate, circuitry, a processor, a computer, integrated circuit, integrated circuit cores, a pressure sensor, an inertial sensor, a microelectromechanical system (MEMS), a passive device, a physical non-transitory memory medium containing instructions for performing the software function, a portion therein, or a combination thereof.

For illustrative purposes, the computer system 100 is described by operation of the first device 102 and the second device 106. It is understood that the first device 102 and the second device 106 can operate any of the modules and functions of the computer system 100.

Figure 9:
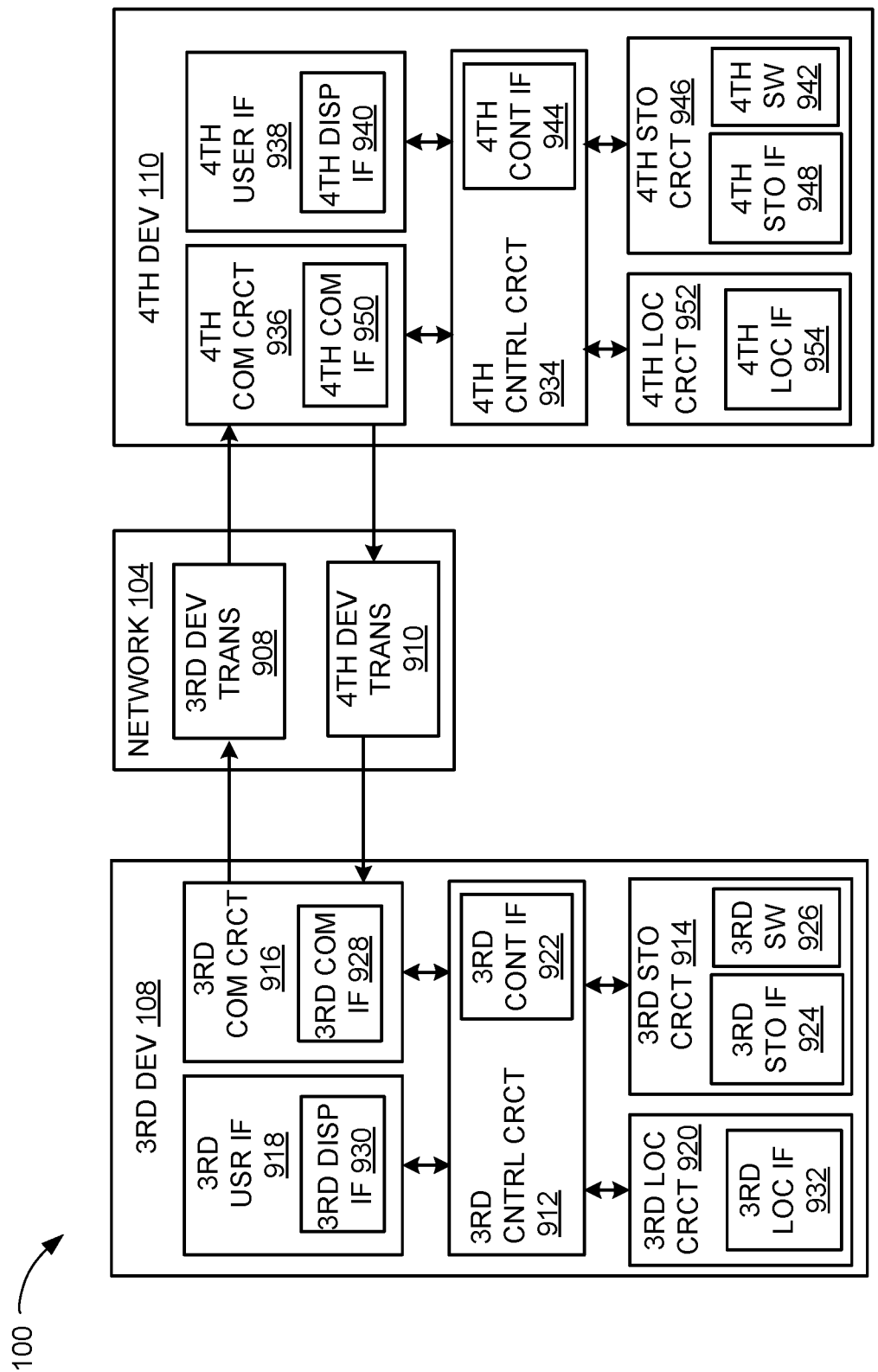
FIG. 9 is an exemplary block diagram of a third device and a fourth device of the computer system.

Referring now to FIG. 9, therein is shown an example of a block diagram a further portion of the computer system 100. The computer system 100 can include the third device 108, the network 104 of FIG. 1, and the fourth device 110. The third device 108 can send information in a third device transmission 908 of FIG. 9 over the network 104 to the fourth device 110. The fourth device 110 can send information in a fourth device transmission 910 of FIG. 9 over the network 104 to the third device.

For illustrative purposes, the computer system 100 is shown with the third device 108 and the fourth device 110 as client devices, although it is understood that the computer system 100 can include the third device 108, the fourth device 110, or a combination thereof as a different type of device. For example, the third device 108 can be a server containing a display interface.

Also for illustrative purposes, the computer system 100 is shown with interaction between the third device 108 and the fourth device 110. However, it is understood that the third device 108 can similarly interact with the first device 102 of FIG. 1, the second device 106 of FIG. 1, or a combination thereof. Similarly, the fourth device 110 can similarly interact with the first device 102, the second device 106, or a combination thereof.

Further, for illustrative purposes, the computer system 100 is shown with interaction between the third device 108 and the fourth device 110, although it is understood that the third device 108 can similarly interact another instance of the third device 108, the first device 102, the second device 106, or a combination thereof. Similarly, the fourth device 110 can similarly interact with another instance of the fourth device 110, the first device 102, the second device 104, or a combination thereof.

For brevity of description in this embodiment of the present invention, the third device 108 and the fourth device 110 will be described as a client device. The embodiment of the present invention is not limited to this selection for the type of devices. The selection is an example of an embodiment of the present invention.

The third device 108 can include a third control circuit 912, a third storage circuit 914, a third communication circuit 916, and a third user interface 918, and a third location circuit 920. The third control circuit 912 can include a third control interface 922. The third control circuit 912 can execute a third software 926 to provide the intelligence of the computer system 100.

The third control circuit 912 can be implemented in a number of different manners. For example, the third control circuit 912 can be a processor, an application specific integrated circuit (ASIC) an embedded processor, a microprocessor, a hardware control logic, a hardware finite state machine (FSM), a digital signal processor (DSP), or a combination thereof. The third control interface 922 can be used for communication between the third control circuit 912 and other functional units or circuits in the third device 108. The third control interface 922 can also be used for communication that is external to the third device 108.

The third control interface 922 can receive information from the other functional units/circuits or from external sources, or can transmit information to the other functional units/circuits or to external destinations. The external sources and the external destinations refer to sources and destinations external to the third device 108.

The third control interface 922 can be implemented in different ways and can include different implementations depending on which functional units/circuits or external units/circuits are being interfaced with the third control interface 922. For example, the third control interface 922 can be implemented with a pressure sensor, an inertial sensor, a microelectromechanical system (MEMS), optical circuitry, waveguides, wireless circuitry, wireline circuitry, or a combination thereof.

The third storage circuit 914 can store the third software 926. The third storage circuit 914 can also store the relevant information, such as data representing incoming images, data representing previously presented image, sound files, or a combination thereof.

The third storage circuit 914 can be a volatile memory, a nonvolatile memory, an internal memory, an external memory, or a combination thereof. For example, the third storage circuit 914 can be a nonvolatile storage such as non-volatile random access memory (NVRAM), Flash memory, disk storage, or a volatile storage such as static random access memory (SRAM).

The third storage circuit 914 can include a third storage interface 924. The third storage interface 924 can be used for communication between the third storage circuit 914 and other functional units or circuits in the third device 108. The third storage interface 924 can also be used for communication that is external to the third device 108.

The third storage interface 924 can receive information from the other functional units/circuits or from external sources, or can transmit information to the other functional units/circuits or to external destinations. The external sources and the external destinations refer to sources and destinations external to the third device 108.

The third storage interface 924 can include different implementations depending on which functional units/circuits or external units/circuits are being interfaced with the third storage circuit 914. The third storage interface 924 can be implemented with technologies and techniques similar to the implementation of the third control interface 922.

The third communication circuit 916 can enable external communication to and from the third device 108. For example, the third communication circuit 916 can permit the third device 108 to communicate with the fourth device 110, an attachment, such as a peripheral device or a desktop computer, and the network 104.

The third communication circuit 916 can also function as a communication hub allowing the third device 108 to function as part of the network 104 and not limited to be an end point or terminal circuit to the network 104. The third communication circuit 916 can include active and passive components, such as microelectronics or an antenna, for interaction with the network 104.

The third communication circuit 916 can include a third communication interface 928. The third communication interface 928 can be used for communication between the third communication circuit 916 and other functional units or circuits in the third device 108. The third communication interface 928 can receive information from the other functional units/circuits or can transmit information to the other functional units or circuits.

The third communication interface 928 can include different implementations depending on which functional units or circuits are being interfaced with the third communication circuit 916. The third communication interface 928 can be implemented with technologies and techniques similar to the implementation of the third control interface 922.

The third user interface 918 allows a user (not shown) to interface and interact with the third device 108. The third user interface 918 can include an input device and an output device. Examples of the input device of the third user interface 918 can include a keypad, a touchpad, soft-keys, a keyboard, a microphone, an infrared sensor for receiving remote signals, or any combination thereof to provide data and communication inputs.

The third user interface 918 can include a third display interface 930. The third display interface 930 can include an output device. The third display interface 930 can include a display, a projector, a video screen, a speaker, or any combination thereof.

The third control circuit 912 can operate the third user interface 918 to display information generated by the computer system 100. The third control circuit 912 can also execute the third software 926 for the other functions of the computer system 100, including receiving location information from the third location circuit 920. The third control circuit 912 can further execute the third software 926 for interaction with the network 104 via the third communication circuit 916.

The third location circuit 920 can generate location information, current heading, current acceleration, and current speed of the third device 108, as examples. The third location circuit 920 can be implemented in many ways. For example, the third location circuit 920 can function as at least a part of the global positioning system, an inertial navigation system, a cellular-tower location system, a pressure location system, or any combination thereof. Also, for example, the third location circuit 920 can utilize components such as an accelerometer or global positioning system (GPS) receiver.

The third location circuit 920 can include a third location interface 932. The third location interface 932 can be used for communication between the third location circuit 920 and other functional units or circuits in the third device 108. The third location interface 932 can also be used for communication external to the third device 108.

The third location interface 932 can receive information from the other functional units/circuits or from external sources, or can transmit information to the other functional units/circuits or to external destinations. The external sources and the external destinations refer to sources and destinations external to the third device 108.

The third location interface 932 can include different implementations depending on which functional units/circuits or external units/circuits are being interfaced with the third location circuit 920. The third location interface 932 can be implemented with technologies and techniques similar to the implementation of the third control circuit 912.

The fourth device 110 can include a fourth control circuit 934, a fourth communication circuit 936, a fourth user interface 938, and a fourth storage circuit 946. The fourth control circuit 934 can execute a fourth software 942 to provide the intelligence of the computer system 100.

The fourth user interface 938 allows a user (not shown) to interface and interact with the fourth device 110. The fourth user interface 938 can include an input device and an output device. Examples of the input device of the fourth user interface 938 can include a keypad, a touchpad, soft-keys, a keyboard, a microphone, or any combination thereof to provide data and communication inputs. Examples of the output device of the fourth user interface 938 can include a fourth display interface 940. The fourth display interface 940 can include a display, a projector, a video screen, a speaker, or any combination thereof.

The fourth control circuit 934 can operate the fourth user interface 938 to display information. The fourth control circuit 934 can also execute the fourth software 942 for the other functions of the computer system 100, including operating the fourth communication circuit 936 to communicate with the third device 108 over the network 104. The fourth software 942 can operate in conjunction with the third software 926, the first software 826 of FIG. 8, the second software 842 of FIG. 8, or a combination thereof.

The fourth control circuit 934 can be implemented in a number of different manners. For example, the fourth control circuit 934 can be a processor, an embedded processor, a microprocessor, hardware control logic, a hardware finite state machine (FSM), a digital signal processor (DSP), or a combination thereof.

The fourth control circuit 934 can include a fourth control interface 944. The fourth control interface 944 can be used for communication between the fourth control circuit 934 and other functional units or circuits in the fourth device 110. The fourth control interface 944 can also be used for communication that is external to the fourth device 110.

The fourth control interface 944 can receive information from the other functional units/circuits or from external sources, or can transmit information to the other functional units/circuits or to external destinations. The external sources and the external destinations refer to sources and destinations external to the fourth device 110.

The fourth control interface 944 can be implemented in different ways and can include different implementations depending on which functional units/circuits or external units/circuits are being interfaced with the fourth control interface 944. For example, the fourth control interface 944 can be implemented with a pressure sensor, an inertial sensor, a microelectromechanical system (MEMS), optical circuitry, waveguides, wireless circuitry, wireline circuitry, or a combination thereof.

A fourth storage circuit 946 can store the fourth software 942. The fourth storage circuit 946 can also store the information such as data representing incoming images, data representing previously presented image, sound files, or a combination thereof.

For illustrative purposes, the fourth storage circuit 946 is shown as a single element, although it is understood that the fourth storage circuit 946 can be a distribution of storage elements. Also for illustrative purposes, the computer system 100 is shown with the fourth storage circuit 946 as a single hierarchy storage system, although it is understood that the computer system 100 can include the fourth storage circuit 946 in a different configuration. For example, the fourth storage circuit 946 can be formed with different storage technologies forming a memory hierarchal system including different levels of caching, main memory, rotating media, or off-line storage.

The fourth storage circuit 946 can be a volatile memory, a nonvolatile memory, an internal memory, an external memory, or a combination thereof. For example, the fourth storage circuit 946 can be a nonvolatile storage such as non-volatile random access memory (NVRAM), Flash memory, disk storage, or a volatile storage such as static random access memory (SRAM).

The fourth storage circuit 946 can include a fourth storage interface 948. The fourth storage interface 948 can be used for communication between the fourth storage circuit 946 and other functional units or circuits in the fourth device 110. The fourth storage interface 948 can also be used for communication that is external to the fourth device 110.

The fourth storage interface 948 can receive information from the other functional units/circuits or from external sources, or can transmit information to the other functional units/circuits or to external destinations. The external sources and the external destinations refer to sources and destinations external to the fourth device 110.

The fourth storage interface 948 can include different implementations depending on which functional units/circuits or external units/circuits are being interfaced with the fourth storage circuit 946. The fourth storage interface 948 can be implemented with technologies and techniques similar to the implementation of the fourth control interface 944.

The fourth communication circuit 936 can enable external communication to and from the fourth device 110. For example, the fourth communication circuit 936 can permit the fourth device 110 to communicate with the third device 108 over the network 104.

The fourth communication circuit 936 can also function as a communication hub allowing the fourth device 110 to function as part of the network 104 and not limited to be an end point or terminal unit or circuit to the network 104. The fourth communication circuit 936 can include active and passive components, such as microelectronics or an antenna, for interaction with the network 104.

The fourth communication circuit 936 can include a fourth communication interface 950. The fourth communication interface 950 can be used for communication between the fourth communication circuit 936 and other functional units or circuits in the fourth device 110. The fourth communication interface 950 can receive information from the other functional units/circuits or can transmit information to the other functional units or circuits.

The fourth communication interface 950 can include different implementations depending on which functional units or circuits are being interfaced with the fourth communication circuit 936. The fourth communication interface 950 can be implemented with technologies and techniques similar to the implementation of the fourth control interface 944.

The third communication circuit 916 can couple with the network 104 to send information to the fourth device 110 in the third device transmission 908. The fourth device 110 can receive information in the fourth communication circuit 936 from the third device transmission 908 of the network 104.

The fourth communication circuit 936 can couple with the network 104 to send information to the third device 108 in the fourth device transmission 910. The third device 108 can receive information in the third communication circuit 916 from the fourth device transmission 910 of the network 104. The computer system 100 can be executed by the third control circuit 912, the fourth control circuit 934, or a combination thereof.

The fourth location circuit 920 can generate location information, current heading, current acceleration, and current speed of the fourth device 110, as examples. The fourth location circuit 920 can be implemented in many ways. For example, the fourth location circuit 920 can function as at least a part of the global positioning system, an inertial navigation system, a cellular-tower location system, a pressure location system, or any combination thereof. Also, for example, the fourth location circuit 920 can utilize components such as an accelerometer or global positioning system (GPS) receiver.

The fourth location circuit 952 can include a fourth location interface 954. The fourth location interface 954 can be used for communication between the fourth location circuit 952 and other functional units or circuits in the fourth device 110. The fourth location interface 954 can also be used for communication external to the fourth device 110.

The fourth location interface 954 can receive information from the other functional units/circuits or from external sources, or can transmit information to the other functional units/circuits or to external destinations. The external sources and the external destinations refer to sources and destinations external to the fourth device 110.

The fourth location interface 954 can include different implementations depending on which functional units/circuits or external units/circuits are being interfaced with the fourth location circuit 952. The fourth location interface 954 can be implemented with technologies and techniques similar to the implementation of the fourth control circuit 912.

For illustrative purposes, the fourth device 110 is shown with the partition containing the fourth user interface 938, the fourth storage circuit 946, the fourth control circuit 934, and the fourth communication circuit 936, although it is understood that the fourth device 110 can include a different partition. For example, the fourth software 942 can be partitioned differently such that some or all of its function can be in the fourth control circuit 934 and the fourth communication circuit 936. Also, the fourth device 110 can include other functional units or circuits not shown in FIG. 9 for clarity.

The functional units or circuits in the third device 108 can work individually and independently of the other functional units or circuits. The third device 108 can work individually and independently from the fourth device 110 and the network 104.

The functional units or circuits in the fourth device 110 can work individually and independently of the other functional units or circuits. The fourth device 110 can work individually and independently from the third device 108 and the network 104.

The functional units or circuits described above can be implemented in hardware. For example, one or more of the functional units or circuits can be implemented using the a gate, circuitry, a processor, a computer, integrated circuit, integrated circuit cores, a pressure sensor, an inertial sensor, a microelectromechanical system (MEMS), a passive device, a physical non-transitory memory medium including instructions for performing the software function, a portion therein, or a combination thereof.

For illustrative purposes, the computing system 100 is described by operation of the third device 108 and the fourth device 110. It is understood that the third device 108 and the fourth device 110 can operate any of the modules and functions of the computer system 100.

Figure 10:
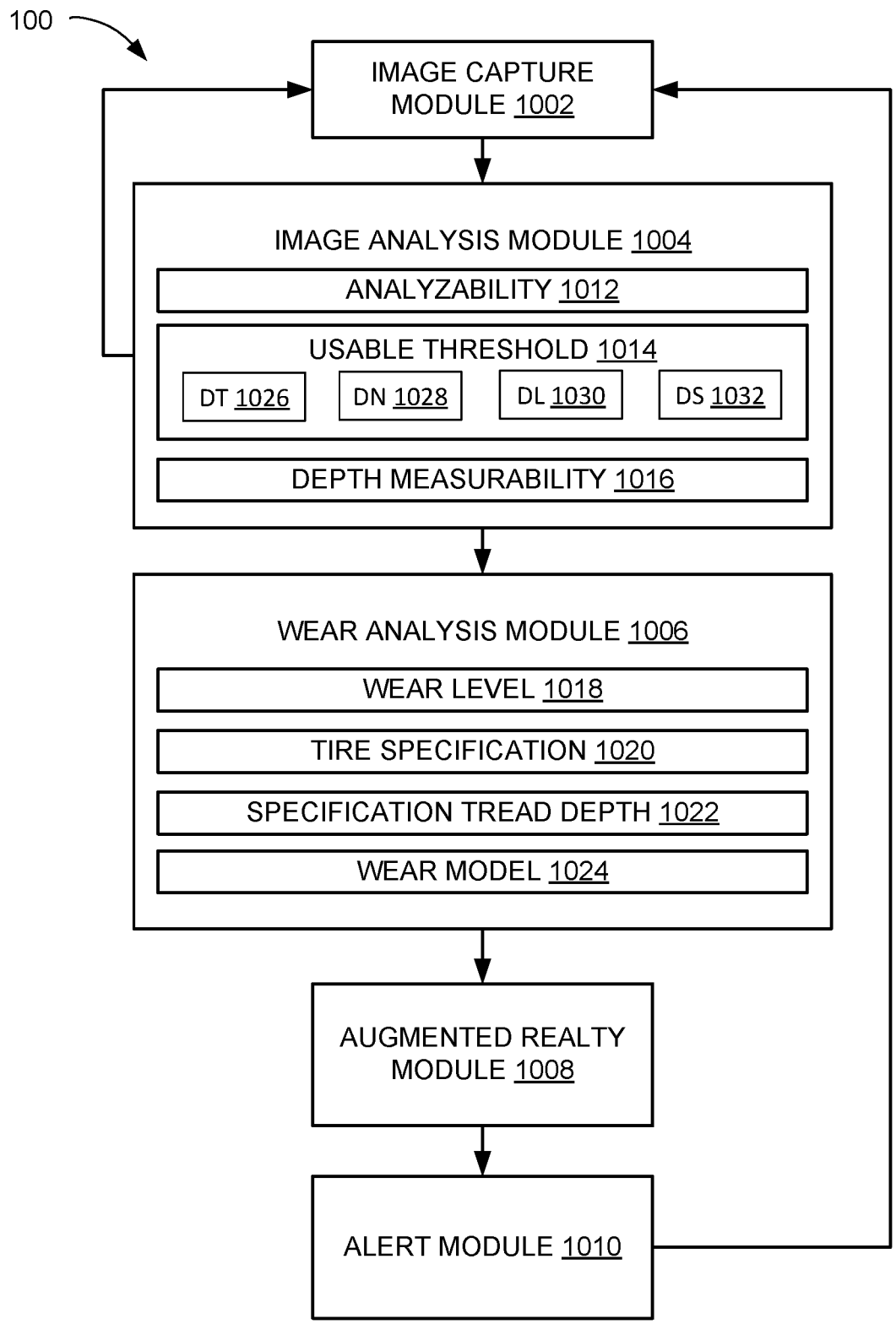
FIG. 10 is an example of a control flow of the computer system.

Referring now to FIG. 10, therein is shown a control flow of the computer system 100. The example shown FIG. 10 depicts the computer system 100 to assess the wear of the target tire 302. The computer system 100 can include an image capture module 1002, an image analysis module 1004, a wear analysis module 1006, an augmented reality module 1008, an alert module 1010, or a combination thereof. The aforementioned modules can be included in the first software 826 of FIG. 8, the second software 842 of FIG. 8, the third software 926 of FIG. 9, the fourth software 942 of FIG. 9, or a combination thereof.

As an example, the image capture module 1002 can be coupled to the image analysis module 1004. Also as an example, the image analysis module 1004 can be coupled to the wear analysis module 1006 and the image capture module 1002. Also as an example, the wear analysis module 1006 can be coupled to the augmented reality module 1008. Further as an example, the augmented reality module 1008 can be coupled to the alert module 1010.

The modules can be coupled using wired or wireless connections, by including an output of one module as an input of the other module, by including operations of one module influence operation of the other module, or a combination thereof. The module can be directly coupled with no intervening structures or objects other than the connector there-between, or indirectly coupled.

The image capture module 1002 is configured to capture the tire image 304 of FIG. 3 for the target tire 302, to store the captured image 402 of the target tire 302, and to transmit the tire image 304, the captured image 402, or a combination thereof of the target tire 302. For example, the image capture module 1002 can manually or opportunistically capture the tire image 304 on the first device 102 of FIG. 1, the second device 106 of FIG. 1, the third device 108 of FIG. 1, the fourth device 110 of FIG. 1, the vehicle system 202 of FIG. 2, the external capture devices 602 of FIG. 6, the embedded capture devices 610 of FIG. 6, or a combination thereof.

The image capture module 1002 can manually capture the tire image 304 of the target tire 302 with the direct user input 114 on the first device 102, the second device 106, the third device 108, the fourth device 110, the vehicle system 202, the external capture devices 602, the embedded capture devices 610 or a combination thereof. The image capture module 1002 can opportunistically capture the tire image 304 of the target tire 302 by the first device 102, the second device 106, the third device 108, the fourth device 110, the vehicle system 202, the external capture device 602, the embedded capture device 610, or a combination thereof based on time intervals, triggering conditions or events, continuously, or a combination thereof.

The image capture module 1002 can opportunistically capture the tire image 304 of the target tire 302 by identifying a specific instance of the tire 213 on a specific instance of the vehicle system 202. For example, the image capture module 1002 can identify the target tire 302 by identifying the tire 213 on the specific axle and side of a specific instance of the vehicle system 202. As a further example, the image capture module 1002 can identify the target tire 302 by identifying the tire 213 and the associated structure 306.

As a further example, the image capture module 1002 can store the tire image 304 of the target tire 302 as the captured image 402 of the target tire 302 on the first device 102, the second device 106, the third device 108, the fourth device 110, the vehicle system 202, the external capture devices 602, the embedded capture devices 610, or a combination thereof.

Also for example, image capture module 1002 can transmit the tire image 304, the captured image 402, or a combination thereof of the target tire 302 from or to the first device 102, the second device 106, the third device 108, the fourth device 110, the vehicle system 202, the external capture devices 602, the embedded capture devices 610, or a combination thereof.

The image capture module 1002 can capture the tire image 304 operating one or more control circuits, such as the first control circuit 812 of FIG. 8, the second control circuit 834 of FIG. 8, the third control circuit 912 of FIG. 9, the fourth control circuit 934 of FIG. 9, the vehicle control circuit 206 of FIG. 2, or a combination thereof. The image capture module 1002 can store the captured image 402 in one or more storage circuits, such as the first storage circuit 814 of FIG. 8, the second storage circuit 846 of FIG. 8, the third storage circuit 914 of FIG. 9, the fourth storage circuit 946 of FIG. 9, the vehicle storage circuit 208 of FIG. 2, or a combination thereof.

The image capture module 1002 can transmit the tire image 304, the captured image 402, or a combination thereof with one or more communication circuits, such as the first communication circuit 816 of FIG. 8, the second communication circuit 836 of FIG. 8, the third communication circuit 916 of FIG. 9, the fourth communication circuit 936 of FIG. 9, the vehicle communication circuit 204 of FIG. 2, or a combination thereof.

Once the image capture module 1002 captures the tire image 304, stores the captured image 402, and transmits the tire image 304, the captured image 402, or a combination thereof, the flow can progress to the image analysis module 1004 to generate the composite image 502 of the target tire 302 for analysis.

The image analysis module 1004 is configured to generate the composite image 502 of FIG. 5 for the target tire 302 and to determine an analyzability for the composite image 502 of the target tire 302. The image analysis module 1004 can generate the composite image 502 of the target tire 302 by compiling and aggregating the tire image 304 of the target tire 302, the captured image 402 of the target tire 302, or a combination thereof.

For example, the image analysis module 1004 can generate the composite image 502 on the first device 102, the second device 106, the third device 108, the fourth device 110, the vehicle system 202, or a combination thereof. The image analysis module 1004 can generate the composite image 502 operating one or more control circuits, such as the first control circuit 812, the second control circuit 834, the third control circuit 912, the fourth control circuit 934, the vehicle control circuit 206, or a combination thereof.

The image analysis module 1004 can also determine the analyzability 1012 of the target tire 302. The analyzability 1012 is the ability to analyze the wear of the target tire 302 based on the tire image 304, the composite image 502, or a combination thereof. For example, the analyzability 1012 determines whether the tire image 304, the composite image 502, or a combination thereof of the target tire 302 meets or exceeds a usable threshold 1014.

The usable threshold 1014 is the amount of information required in the tire image 304, the composite image 502, or a combination thereof of the target tire 302. For example, the usable threshold 1014 can include the debris 404 of FIG. 4 as a factor. As a specific example, the usable threshold 1014 can take into account whether of the target tire 302 is free of the debris 404. As another specific example, the usable threshold 1014 can take into account a debris type 1026, a debris number 1028, a debris location 1030, a debris severity 1032, or a combination thereof of the debris 404.

The debris type 1026 represent the impact of the debris 404 relative to the structure of the tire 213, the target tire 302, or a combination thereof. The debris type 1026 can provide information on whether a specific instance of the debris 404 is along surface only, puncture into an interior of the target tire 302, or partially puncture the surface but not into the interior.

The debris number 1028 represents the number of the debris 404 present on the target tire 302. As an example, the debris number 1028 can represent the total number of the debris 404. Also for example, the debris number 1028 can represent the number of debris 404 for each of the debris type 1026.

The debris location 1030 represent a physical location for each of the debris 404 relative to the target tire 302. The debris location 1030 can be based on one or more coordinate system. For example, the lateral sides of the target tire 302 can be based on a polar coordinate system where a center a lateral side of the target tire 302 can represent the origin of the polar system and a rotation of the target tire 302 can be fixed based on an unique marking or registration along a side wall of the target tire 302. An example of the unique marking or registration can include the tire specification 1020 in a predetermined orientation. Also for example for the tread area, the debris location 1030 can be specified by a center line along the circumference of the tread 406 and the debris location 1030 can be specified by a distance from the center line. The debris location 1030 along the tread 406 can also be specified in conjunction with the polar coordinates to determine where in the circumference should the distance from the center line be located.

The debris severity 1032 provides an indication of the safety risk for each of the debris 404. For example, the debris 404 as a nail puncture at the debris location 1032 at the side wall of the target tire 302 can have the debris severity 1032 as "high". The "high" indication refers to the debris type 1026, the debris number 1028, the debris location 1030, or a combination thereof renders that instance of the debris 404 as being unsafe, not repairable, or a combination thereof. Also for example, the debris 404 as a small pebble within one of the grooves 408 of the tread 406 can have the debris severity 1032 as "low". The "low" indication refers to the debris type 1026, the debris number 1028, the debris location 1030, or a combination thereof renders that instance of the debris 404 as safe, repairable, or a combination thereof. Further for example, the debris 404 as a small nail puncture near the center line of the tread 406 of the target tire 302 can have the debris severity 1032 as "medium". The "medium" indication refers to the debris type 1026, the debris number 1028, the debris location 1030, or a combination thereof renders that instance of the debris 404 as being potentially unsafe, potentially non-repairable, or a combination thereof. The indications for "high", "low", "medium", or a combination thereof can be depicted by colors, text, symbols or a combination thereof with augmented reality.

As a further example, the usable threshold 1014 can also utilize information about the tread 406 of FIG. 4 of the target tire 302, the grooves 408 of FIG. 4 of the target tire 302, the associated structure 306 of FIG. 3 of the target tire 302, or a combination thereof. As a further example, the usable threshold 1014 can provide a depth measurability 1016 for the target tire 302.

The depth measurability 1016 is the ability to determine the tread depth 410 of FIG. 4 based on the tire image 304, the composite image 502, or a combination thereof of the target tire 302. For example, the depth measurability 1016 can be the ability to locate the top of the tread 406 and the bottom of the groove 408 in the tire image 304, the composite image 502, or a combination thereof. As a specific example, the depth measurability 1016 can be the ability to determine the target tread depth 504 of FIG. 5 of the target tire 302. The image analysis module 1004 can determine that the analyzability 1012 of the tire image 304, the composite image 502, or a combination thereof that meets or exceeds the usable threshold 1014 by determining the depth measurability 1016 of the target tread depth 504.

The image analysis module 1004 can determine the analyzability 1012 of the target tire 302 on the first device 102, the second device 106, the third device 108, the fourth device 110, the vehicle system 202, or a combination thereof. The image analysis module 1004 can determine the analyzability 1012 of the target tire 302 operating one or more control circuits, such as the first control circuit 812, the second control circuit 834, the third control circuit 912, the fourth control circuit 934, the vehicle control circuit 206, or a combination thereof.

Once the image analysis module 1004 determines the analyzability 1012 of the target tire 302 meets or exceed the usable threshold 1014, the flow can progress to the wear analysis module 1006 to determine a wear level 1018 of the target tire 302. If the image analysis module 1004 determines the analyzability 1012 of the target tire 302 does not meet or exceed the usable threshold 1014, the flow can progress to the image capture module 1002 to capture additional instances of the tire image 304 of the target tire 302.

The wear analysis module 1006 can analyze the wear level 1018 of the target tire 302 based on the tire image 304, the composite image 502, or a combination thereof. The wear level 1018 is the amount of wear or use of the target tire 302. For example, the wear analysis module 1006 can analyze the wear level 1018 of the target tire 302 by obtaining a tire specification 1020, generating a wear model 1024, and assessing the wear level 1018 of the target tire 302 based on the tire specification 1020, the wear model 1024, or a combination thereof.

The wear analysis module 1006 can obtain the tire specification 1020 by communicating with an external database or entity. The tire specification 1020 is the manufacturer's information for the target tire 302 based on the tire part number 312 of FIG. 3. For example, the tire specification 1020 can provide information such as type, width, aspect ratio, speed rating, construction type, and rim diameter. As a further example, the tire specification 1020 can provide a specification tread depth 1022.

The specification tread depth 1022 is the tread depth 410 from the manufacturer of the target tire 302 based on the tire part number 312. For example, the specification tread depth 1022 can be the tread depth 410 of the target tire 302 based on the standards of the manufacturer. As a further example, the specification tread depth 1022 can be the recommendation from the manufacturer for the tread depth 410 of the target tire 302 before requiring a replacement. The specification tread depth 1022 can represent a recommended value or range for the tread depth 410.

The wear analysis module 1006 can obtain the tire specification 1020, the specification tread depth 1022, or a combination thereof on the first device 102, the second device 106, the third device 108, the fourth device 110, the vehicle system 202, or a combination thereof. The wear analysis module 1006 can obtain the tire specification 1020 operating the first communication circuit 816, the second communication circuit 836, the third communication circuit 916, the fourth communication circuit 936, the vehicle communication circuit 204, or a combination thereof.

Returning to the example, the wear analysis module 1006 can also generate the wear model 1024 for the target tire 302. The wear model 1024 is a database of information for the target tire 302 based on the tire part number 312. For example, the wear model 1024 can be generated based on the compilation of the tire image 304 of the target tire 302, the captured image 402 of the target tire 302, the tire specification 1020 of the target tire 302, or a combination thereof. As a further example, the wear model 1024 can provide the tread depth 410 at which the target tire 302 presents potential safety risks. As a further example, the wear model 1024 can provide the remaining use of the tread depth 410 for the target tire 302.

The wear analysis module 1006 can generate the wear model 1024 on the first device 102, the second device 106, the third device 108, the fourth device 110, the vehicle system 202, or a combination thereof. The wear analysis module 1006 can generate the wear model 1024 operating the first control circuit 812, the second control circuit 834, the third control circuit 912, the fourth control circuit 934, the vehicle control circuit 206, or a combination thereof.

Returning to the example, the wear analysis module 1006 can assess the wear level 1018 of the target tire 302 based on the tire image 302, the composite image 502, or a combination thereof by comparing the target tire 302, the target tread depth 504, or a combination thereof to the tire specification 1020, the specification tread depth 1022, the wear model 1024, or a combination thereof. For example, the wear analysis module 1006 can assess the deviation of the target tire 302 from the tire specification 1020. As a further example, the wear analysis module 1006 can assess the deviation of the target tread depth 504 from the specification tread depth 1022. Also as a further example, the wear analysis module 1006 can assess that the target tire 302, the target tread depth 504, or a combination thereof to the wear model 1024 to determine when the target tire 302 presents potential safety risks.

The wear analysis module 1006 can assess the wear level 1018 of the target tire 302 on the first device 102, the second device 106, the third device 108, the fourth device 110, the vehicle system 202, or a combination thereof. The wear analysis module 1006 can assess the wear level 1018 of the target tire 302 operating the first control circuit 812, the second control circuit 834, the third control circuit 912, the fourth control circuit 934, the vehicle control circuit 206, or a combination thereof.

Once the wear analysis module 1006 determines the wear level 1018 of the target tire 302, the control flow can progress to the augmented reality module 1008 to generate the augmented reality image 702 of FIG. 7. The augmented reality module 1008 can generate the augmented reality image 702 based on the output of the wear level 1018 from the wear analysis module 1006.

The augmented reality module 1008 can generate the augmented reality image 702 to represent the wear risk 704 of FIG. 7 of the target tire 302. For example, the augmented reality module 1008 can determine the wear risk 704 of the target tire 302 based on the wear level 1018 assessed by the wear analysis module 1006. For example, the wear risk 704 can correlate with the wear level 1018 for the target tire 302. As a further example, the wear risk 704 can represent the remaining use for the target tire 302 based on the wear level 1018.

The augmented reality module 1008 can determine the wear risk 704 on the first device 102, the second device 106, the third device 108, the fourth device 110, the vehicle system 202, or a combination thereof. The augmented reality module 1008 can determine the wear risk 704 operating the first control circuit 812, the second control circuit 834, the third control circuit 912, the fourth control circuit 934, the vehicle control circuit 206, or a combination thereof.

The augmented reality module 1008 can also generate the augmented reality image 702 to represent the wear risk 704 for the target tire 302. For example, the augmented reality module 1008 can represent the wear risk 704 of the target tire 302 utilize colors, texts, graphical images, or a combination thereof.

The augmented reality module 1008 can generate the augmented reality image 702 on the first device 102, the second device 106, the third device 108, the fourth device 110, the vehicle system 202, or a combination thereof. The augmented reality module 1008 can generate the augment reality image 702 operating one or more control circuits, such as the first control circuit 812, the second control circuit 834, the third control circuit 912, the fourth control circuit 934, the vehicle control circuit 206, or a combination thereof.

Once the augmented reality module 1008 generates the augment reality image 702 to represent the wear risk 704 of the target tire 302, the control flow can progress to the alert module 1010. The alert module 1010 can display the augmented reality image 702 generated by the augmented reality module 1008.

The alert module 1010 displays the augmented reality image 702 to represent the wear risk 704 of the target tire 302. For example, the alert module 1010 can display the augmented reality image 702 on the first device 102, the second device 106, the third device 108, the fourth device 110, the vehicle system 202, or a combination thereof. The alert module 1010 can display the augmented reality image 702 in one or more display interface, such as the first display interface 830, the second display interface 840, the third display interface 930, the fourth display interface 940, or a combination thereof.

It has been discovered that the computer system 100 with the tire wear measurement mechanism can allow the computer system 100 greater efficiency and reliability to analyze the wear level 1018 of the target tire 302.

It has been yet further discovered that the computer system 100 with the tire wear measurement mechanism can minimize the complexity to detect the wear level 1018 of the target tire 302 by opportunistically capturing the tire image 304 of the target tire 302. The computer system 100 can store and gather the tire image 304, the captured image 402, or a combination thereof of the target tire 302.

It has been yet further discovered that the computer system 100 can improve the reliability to detect the wear level 1018 by compiling and aggregating the tire image 304, the captured image 402, or a combination thereof to generate the composite image 502 to provide additional information for the target tire 302. The composite image 502 can provide information that is not available in the tire image 304, the captured image 402, or a combination thereof. Further, the composite image 502 improves the analyzability 1012 for the target tire 302 by determining whether the composite image 503 meets or exceeds the usable threshold 1014.

It has been yet further discovered that the computer system 100 can improve the reliability to detect the wear level 1018 by determining the analyzability 1012 based on a wear model 1024. The wear model 1024 can improve the analyzability 1012 of the wear level 1018 for the target tire 302 by utilizing information that is not available in the tire image 304, the captured image 402, the composite image 502, or a combination thereof.

It has been yet further discovered that the simplified and robust determination of the wear level 1018 allows for the computer system 100 to provide the wear risk 704 in the real world. The wear risk 704 can be displayed in the real world utilizing the augmented reality image 702. The augmented reality image 702 can alert the user 112 of the wear risk 704 for the target tire 302. As an example, the computer system 100 can minimize the risk of accidents caused by tire blowouts, poor health of tire tread, unsafe conditions, or a combination thereof.

The modules described in this application can be hardware implementation or hardware accelerators, including passive circuitry, active circuitry, or both, in the first storage circuit 814, the second storage circuit 846, the third storage circuit 914, the fourth storage circuit 946, the vehicle storage circuit 208, the first control circuit 812, the second control circuit 834, the third control circuit 912, the fourth control circuit 934, the vehicle control circuit 206, or a combination thereof. The module can also be hardware implementation or hardware accelerators, including passive circuitry, active circuitry, or both, within the first device 102, the second device 106, the third device 108, the fourth device 110, the vehicle system 202, or a combination thereof but outside of the first storage circuit 814, the second storage circuit 846, the third storage circuit 914, the fourth storage circuit 946, the vehicle storage circuit 208, the first control circuit 812, the second control circuit 834, the third control circuit 912, the fourth control circuit 934, the vehicle control circuit 206, or a combination thereof.

The computer system 100 has been described with module functions or order as an example. The computer system 100 can partition the modules differently or order the modules differently. For example, the first software 826 of FIG. 8 of the first device 102 can include the modules for the computing system 100. As a specific example, the first software 826 can include the image capture module 1002, the image analysis module 1004, the wear analysis module 1006, the augmented reality module 1008, the alert module 1010, and associated sub-modules included therein.

The first control circuit 812 can execute the first software 826 to operate the modules. For example, the first control circuit 812 can implement the image capture module 1002, the image analysis module 1004, the wear analysis module 1006, the augmented reality module 1008, the alert module 1010, and associated sub-modules included therein.

In another example of module partitions, the second software 842 of FIG. 8 of the second device 106 can include the modules for the computing system 100. As a specific example, the second software 842 can include the image capture module 1002, the image analysis module 1004, the wear analysis module 1006, the augmented reality module 1008, the alert module 1010, and associated sub-modules included therein.

The second control circuit 834 can execute the second software 842 to operate the modules. For example, the second control circuit 834 can implement the image capture module 1002, the image analysis module 1004, the wear analysis module 1006, the augmented reality module 1008, the alert module 1010, and associated sub-modules included therein.

In another example of module partitions, the third software 926 of FIG. 9 of the third device 108 can include the modules for the computing system 100. As a specific example, the third software 926 can include the image capture module 1002, the image analysis module 1004, the wear analysis module 1006, the augmented reality module 1008, the alert module 1010, and associated sub-modules included therein.

The third control circuit 912 can execute the third software 926 to operate the modules. For example, the third control circuit 912 can implement the image capture module 1002, the image analysis module 1004, the wear analysis module 1006, the augmented reality module 1008, the alert module 1010, and associated sub-modules included therein.

In another example of module partitions, the fourth software 942 of FIG. 9 of the fourth device 110 can include the modules for the computing system 100. As a specific example, the fourth software 942 can include the image capture module 1002, the image analysis module 1004, the wear analysis module 1006, the augmented reality module 1008, the alert module 1010, and associated sub-modules included therein.

The fourth control circuit 934 can execute the fourth software 942 to operate the modules. For example, the fourth control circuit 934 can implement the image capture module 1002, the image analysis module 1004, the wear analysis module 1006, the augmented reality module 1008, the alert module 1010, and associated sub-modules included therein.

The computer system 100 has been described with module functions order as an example. The computing system 100 can partition the modules differently or order the modules differently. For example, the image capture module 1002 can the image analysis module 1004 can be combined into a single module. Also for example, the augmented reality module 1008 can utilize outputs directly from the image capture module 1002. Further for example, the alert module 1010 can loop back to the augmented reality module 1008. Yet further for example, the various modules can be implemented in a different device, or the functionalities of the modules can be distributed across multiple devices. Also as an example, the various modules can be stored in a non-transitory memory medium.

As a more specific example, one or more modules described above can be stored in the non-transitory memory medium for distribution to a different system, a different device, a different user, or a combination thereof, for manufacturing, or a combination thereof. Also as a more specific example, the modules described above can be implemented or stored using a single hardware unit or circuit, such as a chip or a processor, or across multiple hardware units or circuits.

The modules described in this application can be stored in the non-transitory computer readable medium. The first storage circuit 814, the second storage circuit 846, the third storage circuit 914, the fourth storage circuit 946, or a combination thereof can represent the non-transitory computer readable medium. The first storage circuit 814, the second storage circuit 846, the third storage circuit 914, the fourth storage circuit 946, the vehicle storage circuit 208, or a combination thereof, or a portion therein can be removable from the first device 102, the second device 106, the third device 108, the fourth device 110, the vehicle system 202, or a combination thereof. Examples of the non-transitory computer readable medium can be non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the computing system 100 or installed as a removable portion of the computing system 100.

The physical transformation of the wear level 1018 and the wear risk 704 representing the real-world environment results in the display of the information in the augmented reality image 702. The augmented reality image 702 representing the wear level 1018 and the wear risk 704 results in the real-time assessment in the physical world, such as physical change in information or environment processed for the user 112 on one or more of the devices or physical displacement of the tire 213, the target tire 302, or a combination thereof. Assessment in the physical world results in updates to the user 112 which can be fed back into the computer system 100 and further influence the tire 213, the target tire 302, or a combination thereof.

Figure 11:
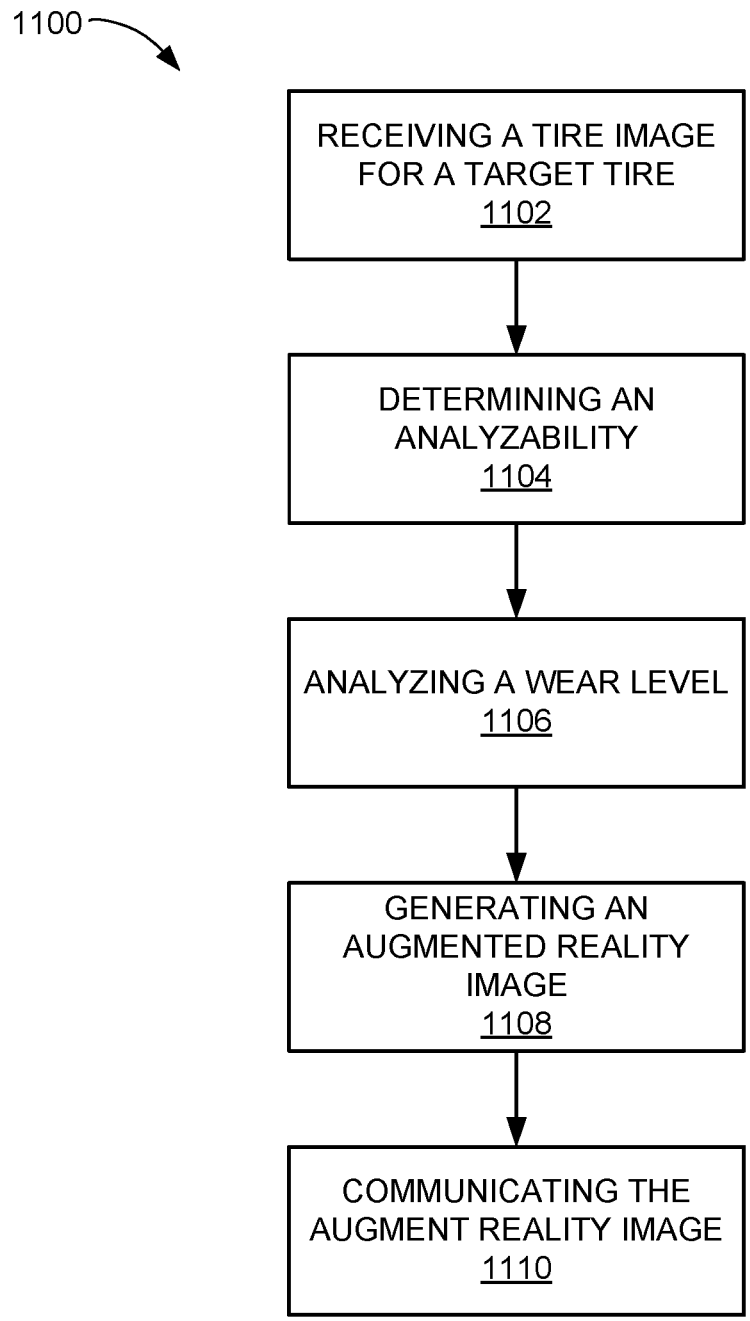
FIG. 11 is a flow chart of a method of operation of the computer system in an embodiment of the present invention.

Referring now to FIG. 11, therein is shown a flow chart of a method 1100 of operation of the computer system 100 in an embodiment of the present invention. The method 1100 includes: receiving a tire image for a target tire in a box 1102; determining an analyzability for the target tire based on a wear model including the tire image in a box 1104; analyzing a wear level for the target tire based on the analyzability meets or exceeds a usable threshold in a box 1106; generating an augmented reality image for the wear level for the target tire in a box 1108; and communicating the augmented reality image for displaying the wear level for the target tire in a box 1110.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level. While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operation for a computer system comprising:
   receiving a tire image for a target tire;
   receiving captured image for the target tire captured opportunistically by a device, wherein opportunistic capturing is done without a manual or automated action for the specific purpose to move or orient the device;
   determining an analyzability of a composite image is sufficient to assess a wear level of the target tire based on the amount of information required in the composite image meets or exceeds a usable threshold;
   analyzing the wear level for the target tire based on a wear model;
   generating an augmented reality image for the wear level for the target tire; and
   communicating the augmented reality image for displaying the wear level for the target tire.

2. The method as claimed in claim 1 wherein determining the analyzability of the composite image includes:
   generating the composite image based on the captured image for the target tire and the tire image of the target tire;
   determining a depth measurability for a target tread depth based on the composite image; and
   generating the analyzability based on the depth measurability.

3. The method as claimed in claim 1 further comprising:
identifying a tire part number for the target tire;
accessing a tire specification for the tire part number;
wherein analyzing the wear level includes:
calculating a target tread depth of the target tire; and
generating the wear level based on the target tread depth and a specification tread depth from the tire specification.

4. The method as claimed in claim 1 wherein receiving the captured image for the target tire includes receiving the tire image captured opportunistically.

5. The method as claimed in claim 1 further comprising:
identifying a tire part number for the target tire;
assessing a tire specification for the tire part number; and
generating the wear model based on the captured image for the target tire, the tire image, the tire specification, or a combination thereof.

6. The method as claimed in claim 1 further comprising:
generating the wear model based on the captured image for the target tire; and
wherein:
the tire image captured opportunistically.

7. The method as claimed in claim 1 wherein generating the augmented reality image for the wear level for the target tire includes generating a wear risk for displaying over the target tire.

8. A computer system comprising:
a communication circuit configured to:
receive a tire image for a target tire;
receive a captured image for target tire captured opportunistically by a device, wherein opportunistic capturing is done without a manual or automated action for the specific purpose to move or orient the device;
a control circuit, coupled to the communication circuit, configured to:
determine an analyzability of a composite image is sufficient to assess a wear level of the target tire based on the amount of information required in the composite image meets or exceeds a usable threshold,
analyze the wear level for the target tire based on a wear model,
generate an augmented reality image for the wear level for the target tire, and
communicate the augmented reality image for displaying the wear level for the target tire.

9. The system as claimed in claim 8 wherein the control circuit is further configured to:
generate the composite image based on the captured image for the target tire and the tire image of the target tire,
determine a depth measurability for a target tread depth based on the composite image, and
generate the analyzability based on the depth measurability.

10. The system as claimed in claim 8 wherein the control circuit is further configured to:
identify a tire part number for the target tire;
access a tire specification for the tire part number;
calculate a target tread depth of the target tire; and
generate the wear level based on the target tread depth and a specification tread depth from the tire specification.

11. The system as claimed in claim 8 wherein the control circuit is further configured to receive the tire image captured opportunistically.

12. The system as claimed in claim 8 wherein the control circuit is further configured to:
identify a tire part number for the target tire;
assess a tire specification for the tire part number; and
generate the wear model based on the captured image for the target tire, the tire image, the tire specification, or a combination thereof.

13. The system as claimed in claim 8 wherein the control circuit is further configured to generate the wear model based on the captured image of the target tire.

14. The system as claimed in claim 8 wherein the control circuit is further configured to generate a wear risk for displaying over the target tire.

15. A non-transitory computer readable medium including instructions executable by a control circuit for a computer system comprising:
receiving a tire image for a target tire;
receiving a captured image for the target tire captured opportunistically by a device, wherein opportunistic capturing is done without a manual or automated action for the specific purpose to move or orient the device;
determining an analyzability of a composite image is sufficient to assess a wear level of the target tire based on the amount of information required in the composite image meets or exceeds a usable threshold;
analyzing the wear level for the target tire based on a wear model;
generating an augmented reality image for the wear level for the target tire; and
communicating the augmented reality image for displaying the wear level for the target tire.

16. The non-transitory computer readable medium as claimed in claim 15 further comprising:
generating the composite image based on the captured image for the target tire and the tire image of the target tire;
determining a depth measurability for a target tread depth based on the composite image; and
generating the analyzability based on the depth measurability.

17. The non-transitory computer readable medium as claimed in claim 15 further comprising:
identifying a tire part number for the target tire;
accessing a tire specification for the tire part number;
wherein analyzing the wear level includes:
calculating a target tread depth of the target tire; and
generating the wear level based on the target tread depth and a specification tread depth from the tire specification.

18. The non-transitory computer readable medium as claimed in claim 15 further comprising receiving the tire image captured opportunistically.

19. The non-transitory computer readable medium as claimed in claim 15 further comprising:
identifying a tire part number for the target tire;
assessing a tire specification for the tire part number; and
generating the wear model based on the captured image for the target tire, the tire image, the tire specification, or a combination thereof.

20. The non-transitory computer readable medium as claimed in claim 15 further comprising generating the wear model based on the captured image for the target tire.

* * * * *